US006282905B1

(12) United States Patent
Sato et al.

(10) Patent No.: US 6,282,905 B1
(45) Date of Patent: Sep. 4, 2001

(54) GAS TURBINE COMBUSTOR COOLING STRUCTURE

(75) Inventors: Yoshichika Sato; Koichi Nishida, both of Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/437,144

(22) Filed: Nov. 10, 1999

(30) Foreign Application Priority Data

Nov. 12, 1998 (JP) ................................................ 10-322378
Nov. 13, 1998 (JP) ................................................ 10-323704

(51) Int. Cl.[7] ........................................................ F02C 1/00

(52) U.S. Cl. ................................ 60/752; 60/754; 60/756; 60/757; 60/760

(58) Field of Search .............................. 60/752, 754, 756, 60/757, 760

(56) References Cited

U.S. PATENT DOCUMENTS 5,000,005 * 3/1991 Kwan et al. ........................... 60/757
5,528,904 * 6/1996 Jones et al. ............................ 60/753
5,647,202 * 7/1997 Althaus .................................. 60/266
6,000,908 * 12/1999 Bunker ................................... 416/95
6,122,917 * 9/2000 Senior ................................... 60/752

* cited by examiner

*Primary Examiner*—Timothy S. Thorpe
*Assistant Examiner*—Eric D. Hayes
(74) *Attorney, Agent, or Firm*—Wenderoth, Lind & Ponack, L.L.P.

(57) ABSTRACT

Cooling structure of gas turbine combustor in which cooling medium flows through grooves in wall is improved so that adjustment of flow velocity, pressure loss and heat transfer rate of cooling medium flow in the wall becomes possible and cooling effect thereof is enhanced. Wall of combustor tail tube is made in double structure in which outer plate (1) and inner plate (4) are jointed together being lapped one on another. The outer plate (1) has air inlet hole (3) and groove (2) formed therein. The groove (2) is closed by jointing of the inner plate (4) to the outer plate (1). The inner plate (4) has air outlet hole (5) formed therein. The groove (2) communicates with the air inlet hole (3) and the air outlet hole (5). Cross sectional shape of the groove (2) is changed two-dimensionally or three-dimensionally such that width enlarges toward the hole (5) from the hole (3) or depth is constant or changed in tapered form. Cooling air flows into the groove (2) from the air inlet hole (3) of tail tube surface to flow toward both sides along the groove (2) for cooling of the wall. The air is thereby heated to expand to increase flow velocity and pressure loss, but flow passage enlarges toward the hole (5) and flow velocity is suppressed and pressure loss is reduced.

28 Claims, 16 Drawing Sheets

Fig. 17 (a) (Prior Art)
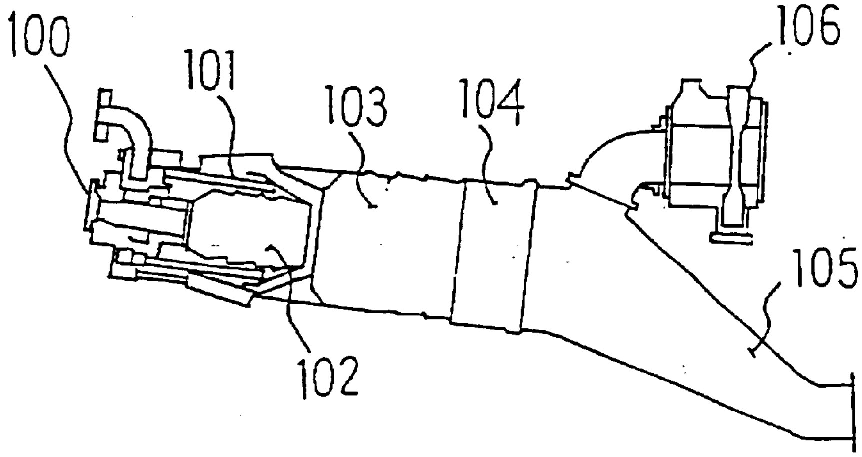
Fig. 17(b) (Prior Art)
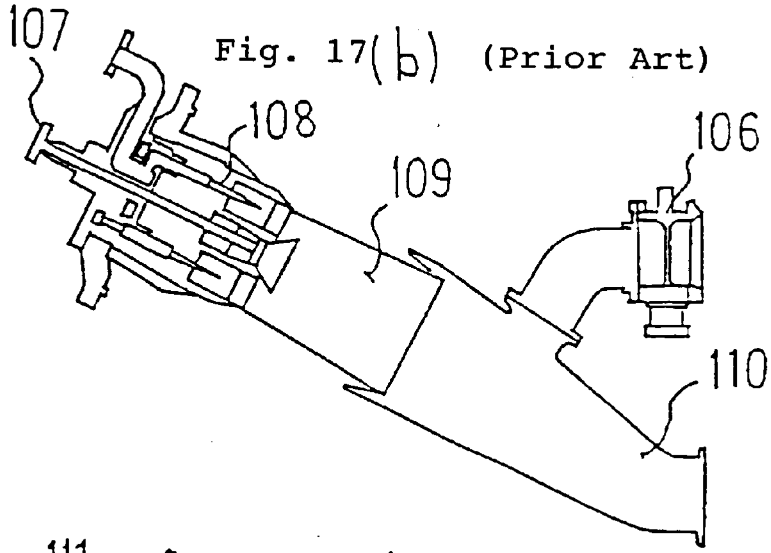
Fig. 17(Pror Art) (C)
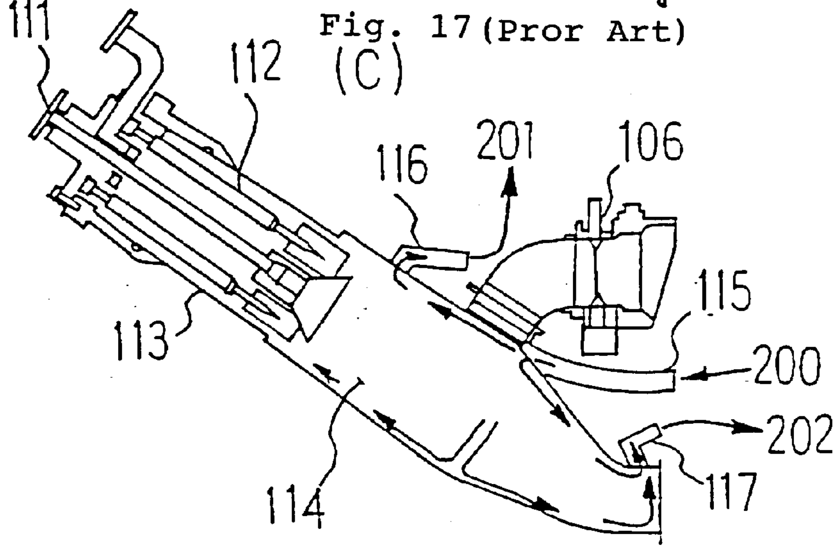

Fig. 19 (Pror Art)

GAS TURBINE COMBUSTOR COOLING STRUCTURE

BACKGROUND OF THE INVENTION

1. Field of the Invention

The present invention relates generally to a cooling structure of gas turbine combustor and more particularly to a cooling structure in which a high temperature portion to be cooled of gas turbine combustor, such as a wall portion and a pilot cone, is made in a double structure of an outer plate and an inner plate so that cooling medium, such as air or steam, flows therein with enhanced cooling efficiency.

2. Description of the Prior Art

FIG. 17 is a schematic cross sectional side view showing structure of a gas turbine combustor and a cooling system thereof in the prior art, wherein FIGS. 17(*a*) and 17(*b*) show examples of air cooled system and FIG. 17(*c*) shows an example of steam cooled system. If description thereon is outlined, in FIG. 17(*a*), numeral 100 designates a pilot nozzle, which injects pilot fuel for combustion thereof, numeral 101 designates a main nozzle, which, being called an annular nozzle type, is arranged in plural pieces around a pilot inner tube 102 and injects main fuel to be ignited by combustion of the pilot fuel in the pilot inner tube 102. Numeral 103 designates a main inner tube, numeral 104 designates a connecting tube and numeral 105 designates a tail tube, and combustion gas of high temperature produced by combustion of the main fuel flows through these portions to be led into a combustion gas path of gas turbine. Numeral 106 designates an air by-pass valve, which causes surplus air coming from a compressor at a low load time to enter the tail tube 105 via a by-pass duct and to escape into the combustion gas path. In said type of combustor, there is employed a cooling structure using air in a wall of the tail tube 105, as described later with reference to FIG. 18.

In a combustor of FIG. 17(*b*), which is called a multiple nozzle type, numeral 107 designates a pilot nozzle, and a main nozzle 108 is arranged in plural pieces therearound. Main fuel is injected from the main nozzle 108 into an inner tube 109 to be ignited by combustion of pilot fuel injected from the pilot nozzle 107. Numeral 110 designates a tail tube and numeral 106 designates an air by-pass valve. In this type of combustor also, wall interior of the tail tube 110 is cooled by air, as described later with reference to FIG. 18.

Combustor of FIG. 17(*c*) is an example where a steam cooled system is employed in the multiple nozzle type combustor.

In FIG. 17(*c*), numeral 111 designates a pilot nozzle, numeral 112 designates a main nozzle, which is arranged in plural pieces around the pilot nozzle 111, and numeral 113 designates a swirler holder. Numeral 114 designates a tail tube, which is made integrally with an inner tube and is connected to the swirler holder 113 so that combustion gas of high temperature is led therethrough into the combustion gas path of gas turbine. In a wall of the tail tube 114, there are provided a multiplicity of steam passages for cooling therearound. Numeral 115 designates a steam supply passage and numerals 116, 117 designate steam recovery passages, respectively. Steam 200 for cooling flows through the steam supply passage 115 to be supplied into the steam passages in the wall of the tail tube 114 for cooling of wall interior thereof and is then recovered into the steam recovery passages 116, 117 provided at respective end portions of the tail tube 114 as steam 201, 202 to be returned to a steam producing source for an effective use thereof.

FIG. 18 is a partially cut away perspective view of the wall of the combustor tail tubes 105, 110 shown in FIGS. 17(*a*) and 17(*b*). In FIG. 18, the wall is made in a double structure in which an outer plate 120 and an inner plate 123 are jointed together being lapped one on another. The outer plate 120 constitutes an outer surface of the tail tube and has a multiplicity of grooves 121, each having a common cross sectional shape, provided therein substantially along a flow direction of the combustion gas. The outer plate 120 is jointed together with the inner plate 123 so that opening faces of the grooves 121 of the outer plate 120 are closed in the jointed plane. Also, in the outer plate 120, there are bored a multiplicity of air inlet holes 122, each communicating with the grooves 121 and being arranged with a predetermined interval between the air inlet holes 122 along each of the grooves (2).

The inner plate 123 has a multiplicity of air outlet holes 124 bored therein so as to communicate with the grooves 121 of the outer plate 120, when the outer plate 120 and the inner plate 123 are so jointed together. Each of the air outlet holes 124 is provided so as to be arranged in a mid position of two mutually adjacent air inlet holes 122 along each of the grooves 121. The outer plate 120 and the inner plate 123 are made of a heat resistant material, such as Hastelloy X, Tomilloy and SUS material, and the jointing thereof is done by diffusion welding in which a hot pressure welding is done under heat and pressure.

In the mentioned wall structure, air 300 for cooling entering the air inlet holes 122 from around the tail tube flows into the respective grooves 121 for cooling of the wall interior and flows out of the air outlet holes 124 of the respective grooves 121 to enter the tail tube as air 301. Such grooves 121, and air inlet holes 122 and air outlet holes 124 both communicating with the grooves 121, are provided in plural pieces in the entire circumferential wall of the tail tube and the air outside of the tail tube is supplied thereinto to flow in the wall interior for cooling of the entire portion of the tail tube wall and flows out of the respective air outlet holes 124 to be mixed into the combustion gas in the tail tube.

FIG. 19 is an enlarged cross sectional side view of the steam cooled type combustor shown in FIG. 17(*c*). As shown there, the swirler holder 113 of combustor, which is fitted to a turbine cylinder 130, is coupled with the tail tube 114 which is made integrally with the inner tube. In an entire circumferential wall of the tail tube 114, there are provided a multiplicity of steam passages 118, 119 substantially along a flow direction of the combustion gas. Each of the steam passages 118, 119 has a common cross sectional shape and communicates with the steam supply passage 115. A portion of the steam 200 in the steam supply passage 115 is supplied toward the nozzle side through the steam passages 118 for cooling of the wall to be recovered into the steam recovery passage 116 as the steam 201. Remainder of the steam 200 is supplied toward the downstream side through the steam passages 119 for cooling of the wall to be recovered into the steam recovery passage 117 as the steam 202.

FIG. 20 is a cross sectional side view of an upper half portion of a pilot cone fitted to an end each of the pilot nozzles of the combustors shown in FIGS. 17(*b*) and 17(*c*). In FIG. 20, the pilot nozzle is provided in the central portion of the combustor inner tube and a pilot cone 130 is fitted to an end of the pilot nozzle. The pilot cone 130 opens in a funnel-like shape, as shown there, and a guide ring 131 is provided around the pilot cone 130 for support thereof. For supporting the pilot cone 130 fixedly, welding is applied to around a connecting portion 132 between the pilot cone 130 and the guide ring 131 with a predetermined interval between the welded places.

In the central portion of the pilot cone 131, pilot fuel injected from the pilot nozzle burns and combustion gas 140 of high temperature flows there. A portion of the combustion gas 140 flows along a tapered wall inner surface of the pilot cone 130 and this wall inner surface is continuously exposed to the high temperature gas. Further, as mentioned above, the plural main nozzles are arranged around the pilot cone 130 and fuel injected therefrom is ignited for combustion by flame of the combustion gas 140 flowing out of the pilot cone 130, hence an outer surface of the pilot cone 130 and the guide ring 131 also are exposed to the high temperature.

Numeral 141 designates air, which flows out of a gap between the pilot cone 130 and the guide ring 131. While this air 141 flows out originally aiming at cutting off flame generated at an outlet end portion of the pilot cone 130 so that it may not continue, the air 141 carries out secondarily a convection cooling of the wall surface of the pilot cone 130 in the process of flowing through the gap between an outer wall surface of the pilot cone 130 and the guide ring 131 to thereby keep the pilot cone 130 cooled. Thus, in the prior art gas turbine combustor, while the tail tube is cooled by air or steam flowing in the grooves for cooling provided in the double structure of the tail tube wall, the pilot cone 130 is cooled by the air 141 flowing on the outer wall surface thereof.

In the mentioned prior art cooling structure of a high temperature portion to be cooled of gas turbine, such as a combustor tail tube, the grooves in the wall are provided having a common cross sectional shape each of the grooves and being arranged linearly in either of the air cooled system and the steam cooled system. For this reason, in order to satisfy a necessary cooling range at a portion where a uniform cooling is needed in the tail tube wall of a short section, a considerable number of linearly arranged cooling grooves are necessarily provided, and yet the cooling medium is discharged before it is fully used of its cooling ability because of the short cooling section, which results in the inevitable use of the cooling medium of more than needed. Also, because the cross sectional shape of the cooling groove is constant, flow velocity, pressure loss and heat transfer rate of the cooling medium are governed by the cross sectional shape, so that the cooling conditions of the cooling medium in the cooling passages from the inlet hole to the outlet hole thereof are decided monovalently by the cross sectional shape, thereby no adjustment thereof can be done, which makes optimized designing difficult.

Also, in the pilot cone which is likewise the high temperature portion to be cooled, while the cooling system thereof is such that the cooling is done by air flowing on the outer wall surface thereof, inlet gas temperature of a modern gas turbine becomes higher gradually, thereby environment of using the combustor is becoming severer year by year. Especially in the multiple pre-mixing type combustor, combustion vibration is becoming a problem. While it is confirmed effective to raise a ratio of pilot fuel as one of countermeasures to mitigate the combustion vibration, if the ratio of pilot fuel is so raised, it leads to an increase of thermal load in the pilot cone wall surface and to an insufficiency of the cooling ability unless the structure thereof is improved. Hence, measures to raise the cooling effect are desired.

SUMMARY OF THE INVENTION

It is therefore an object of the present invention to provide a gas turbine combustor cooling structure which is constructed such that across sectional area of cooling passage in combustor wall is changed and a form of the cooling passage is made not necessarily linearly so that adjustment of flow velocity, pressure loss and heat transfer rate of cooling medium is made possible corresponding to a supply of cooling air or cooling steam, and a length or width of the cooling passage is changed so as to enhance a cooling effect, thereby an optimized designing of cooling structure becomes possible, an improvement of temperature distribution in the combustor wall is attained so as to mitigate thermal stress and to solve problems of crack occurrence, etc. and a reliability is enhanced.

It is also an object of the present invention to provide a gas turbine combustor cooling structure in which a cooling structure of pilot cone is constructed such that the same cooling structure as that in a tail tube is employed as a cooling structure of pilot cone wall so that cooling effect of the pilot cone is enhanced, and the prior art air cooled structure is improved so that effect of the air cooling is enhanced.

In order to achieve said objects, the present invention provides the means of the following (1) to (20).

(1) A gas turbine combustor cooling structure constructed such that cooling medium is supplied into a high temperature portion to be cooled, such as a wall portion or a pilot cone, of a gas turbine combustor for cooling thereof, characterized in that a cooling medium passage is provided in plural rows along a combustion gas flow direction in a component of said high temperature portion to be cooled and a predetermined section of said cooling medium passage has a passage cross sectional width or depth or a passage shape changed in a predetermined form along a cooling medium flow direction.

(2) A gas turbine combustor cooling structure as mentioned in (1) above, characterized in that cooling air is employed as the cooling medium supplied into said high temperature portion to be cooled, said cooling medium passage has an air inlet hole and an air outlet hole, communicating with each other, arranged sequentially with a predetermined interval therebetween along said cooling medium passage, the cooling air flows into said cooling medium passage from said air inlet hole and flows out of said air outlet hole into the combustor and said predetermined section of the cooling medium passage is between said air inlet hole and said air outlet hole and has at least one of said passage cross sectional width and depth changed smoothly along the cooling medium flow direction.

(3) A gas turbine combustor cooling structure as mentioned in (2) above, characterized in that said cooling medium passage has a plurality of turbulators provided in said predetermined section of the cooling medium passage.

(4) A gas turbine combustor cooling structure as mentioned in (2) above, characterized in that said cooling medium passage has a plurality of recessed grooves provided being arranged orthogonally to the cooling medium flow direction in a wall of said predetermined section of the cooling medium passage.

(5) A gas turbine combustor cooling structure as mentioned in Claim 2 above, characterized in that said cooling medium passage has a passage cross sectional area enlarged gradually along the cooling medium flow direction.

(6) A gas turbine combustor cooling structure as mentioned in (2) above, characterized in that said cooling medium passage, in place of being changed smoothly, has a section whose passage cross sectional area is constant and a section whose passage cross sectional area is smaller than said constant one, said sections being arranged alternately so as to communicate with each other.

(7) A gas turbine combustor cooling structure as mentioned in (2) above, characterized in that said cooling medium passage, in place of being changed smoothly, is formed to change in a wave shape.

(8) A gas turbine combustor cooling structure as mentioned in Claim 2 above, characterized in that said air outlet hole is provided obliquely so that the cooling medium flows out thereof into the combustor along the combustion gas flow direction.

(9) A gas turbine combustor cooling structure as mentioned in Claim 2 above, characterized in that said air outlet hole has a cover provided in the vicinity of an outlet thereof so that the cooling medium flows out along the combustion gas flow direction.

(10) A gas turbine combustor cooling structure as mentioned in Claim 2 above, characterized in that said air inlet hole and air outlet hole in said cooling medium passage are arranged so that the cooling medium flow directions in mutually adjacent cooling medium passages are opposite to each other.

(11) A gas turbine combustor cooling structure as mentioned in Claim 2 above, characterized in that said cooling medium passage has an end portion thereof communicating with a mid portion of a hole which is provided in a position to correspond to said end portion of the cooling medium passage so as to pass through said high temperature portion to be cooled from an outer side to an inner side thereof and said hole has a cover provided being inserted into said hole for closing thereof from either the outer side or the inner side of said high temperature portion to be cooled.

(12) A gas turbine combustor cooling structure as mentioned in Claim 2 above, characterized in that a diameter of said air outlet hole is made larger than that of said air inlet hole.

(13) A gas turbine combustor cooling structure as mentioned in (1) above, characterized in that cooling steam is employed as the cooling medium supplied into said high temperature portion to be cooled, said cooling medium passage has a steam supply port and a steam recovery port, the cooling steam flows in from said steam supply port and is recovered into said steam recovery port and said predetermined section of the cooling medium passage has at least one of said passage cross sectional width and depth changed smoothly along the cooling medium flow direction.

(14) A gas turbine combustor cooling structure as mentioned in (13) above, characterized in that said cooling medium passage has a plurality of turbulators provided in said predetermined section of the cooling medium passage.

(15) A gas turbine combustor cooling structure as mentioned in (13) above, characterized in that said cooling medium passage has a plurality of recessed grooves provided being arranged orthogonally to the cooling medium flow direction in a wall of said predetermined section of the cooling medium passage.

(16) A gas turbine combustor cooling structure as mentioned in (13) above, characterized in that said cooling medium passage, in place of being changed smoothly, has a section whose passage cross sectional area is constant and a section whose passage cross sectional area is smaller than said constant one, said sections being arranged alternately so as to communicate with each other.

(17) A gas turbine combustor cooling structure as mentioned in (13) above, characterized in that said cooling medium passage, in place of being changed smoothly, is formed to change in a wave shape.

(18) A gas turbine combustor cooling structure as mentioned in Claim 2 above, characterized in that said cooling medium passage is connected to said steam supply port or said steam recovery port so that the cooling medium flow directions in mutually adjacent cooling medium passages are opposite to each other.

(19) A gas turbine combustor cooling structure as mentioned in Claim 2 above, characterized in that said gas turbine combustor at its wall connecting portion has a connecting portion groove provided therein so that said cooling medium passage communicates with said connecting portion groove.

(20) A gas turbine combustor cooling structure comprising a combustor pilot cone whose wall is constructed such that a plurality of dimples are formed in said wall projecting in a conical shape toward an inner side from an outer side of said wall and a conical portion each of said dimples has a hole bored in said wall along a pilot combustion gas flow direction so that cooling air is injected into the inner side from the outer side of said wall through said hole.

(21) A gas turbine combustor cooling structure comprising a combustor pilot cone which is constructed such that said combustor pilot cone at its circumferential periphery is supported by a guide ring and a plurality of projecting fins are provided along a front and rear direction of said combustor pilot cone on an outer wall surface of said combustor pilot cone between said guide ring and said combustor pilot cone.

The present invention is mainly based on the inventions (1), (2), (6), (7) and (13) above. The invention (1) mentions no specific cooling medium, the inventions (2), (6) and (7) are applied to the air cooled system and the invention (13) is applied to the steam cooled system. In the prior art cooling structure, the passage has a constant cross sectional shape so that flow velocity, pressure loss and heat transfer rate of the cooling medium are decided monovalently according to the cross sectional shape and adjustment thereof is difficult to be done to meet the places of the wall where the temperature distribution is different.

In the inventions (1) and (2), the passage cross sectional shape is changed of the width or depth two-dimensionally or three-dimensionally, thereby the flow velocity can be changed according to the wall portion where the temperature distribution varies and thus the pressure loss also can be reduced and adjustment of the flow velocity, pressure loss and heat transfer rate becomes possible to meet the cooling conditions. Hence, an optimum designing of the cooling passages becomes possible, which improves the temperature distribution to mitigate thermal stress and to prevent occurrence of cracks, etc. and reliability of the combustor can be enhanced.

Where the cooling structure is applied to the pilot cone as the high temperature portion to be cooled, the prior art pilot cone cooling structure is made such that air flows on the outer wall surface of the pilot cone for cooling thereof and when the pilot fuel ratio needs to be increased, insufficiency of the cooling occurs. In the inventions (1) and (2), the cooling passages are provided in the wall of the pilot cone and the cooling medium, cooling air for example, is caused to flow into the cooling passages from the outer side of the pilot cone through the air inlet hole for cooling of the wall interior and then to flow out into the pilot cone through the air outlet hole. Further, the cross sectional shape of the passage is changed of the width or depth two-dimensionally or three-dimensionally, the flow velocity of the cooling medium is changed according to the places of the wall where the temperature distribution is different, the pressure loss is also thereby reduced, thus adjustment of the flow velocity, pressure loss and heat transfer rate becomes possible to meet the pilot cone cooling conditions and an optimum designing of the cooling passages becomes possible so as to improve the temperature distribution to mitigate thermal stress and to prevent occurrence of cracks, etc. and reliability of the combustor is enhanced.

In the inventions (3) and (4), the cooling air flow is well agitated by the effect of the turbulators or the recess portions and thereby the heat transfer rate can be enhanced further. In the invention (5), the cooling air flow velocity is changed, thereby the cooling effect can be enhanced. In the invention (6), the flow passage is throttled by the effect of orifice or is enlarged, thereby the flow velocity can be adjusted. Further, in the invention (7), the passage is formed in the wave-shape, thereby the length of the passage is elongated and in case enhancement of the cooling effect is wanted according to the places where the cooling is specifically needed, such as the combustor wall portion or the pilot cone, an especially high effect can be obtained.

In the invention (8), when the air flows out of the air outlet hole, it is caused to flow along the wall surface in the combustion gas direction for carrying out an effective cooling around the air outlet hole and then to flow out into the combustor. In the invention (9), the same effect as in the invention (8) can be obtained by providing the cover. In the invention (10), the air flow directions are opposite to each other between the mutually adjacent cooling passages, thereby imbalance in the cooling can be dissolved. Also, the combustor wall portion, the pilot cone, etc. are generally constructed having welded connecting portions and the cooling passages often terminate on the way at the connecting portion so that the cooling air may not flow but stagnate there. But, in the invention (11), the through hole is bored in the passage end portion and the cover is provided from the outer side or from the inner side for closing of one side of the hole, thereby the air can be taken in from the outer side or flown out into the combustor and effective cooling can be done at the connecting portion as well.

In the invention (12), the diameter of the air outlet hole is made larger than that of the air inlet hole, thereby the flow velocity on the air intake side is speeded, the cooling air is taken in securely and effective cooling can be attained.

In the invention (13), which is one of the basic inventions here and is applied to the steam cooled system, the steam passage changes its cross sectional area, thereby, like in the air cooled system of the invention (2), adjustment of the flow velocity, pressure loss and heat transfer rate of the steam can be done. That is, the cross sectional area of the steam passage is changed two-dimensionally or three-dimensionally according to the places of the combustor wall where the temperature distribution is different, thereby an optimum designing of the cooling passages becomes possible, which improves the temperature distribution to mitigate thermal stress and to prevent occurrence of cracks, etc. and reliability of the steam cooled system can be enhanced.

In the inventions (14) and (15), the cooling steam flow is agitated by the effect of the turbulators or the recess portions, thereby the heat transfer rate can be enhanced further. In the invention (16), the flow passage is throttled by the effect of orifice or is enlarged, thereby the flow velocity can be adjusted. In the invention (17), the passage is formed in the wave-shape, thereby the length of the passage is elongated and the cooling effect can be enhanced according to the places. In the invention (18), the steam flow directions are opposite to each other between the mutually adjacent cooling passages, thereby imbalance in the cooling is dissolved and the cooling effect can be enhanced. Further, the combustor wall is generally constructed having welded connecting portions and the steam passages terminate on the way at the connecting portion so that the cooling steam may not flow but stagnate there. But in the invention (19), the connecting groove is bored in the connecting portion so that the steam passage end portion communicates with this connecting groove, thereby the steam supply or recovery can be done continuously and effective cooling by the steam can be done at the connecting portion as well.

In the invention (20), the plural dimples are formed in the pilot cone wall and the cooling air flows out of the hole at the conical portion of the dimple along the combustion gas flow direction, thereby the cooling air flows along the inner wall surface of the pilot cone to effect a film cooling. That is, by said air flow, film layer of the cooling air is formed on the wall surface, thereby the wall surface can be cooled effectively.

Further, in the invention (21), fins are provided on the outer wall surface of the pilot cone, thereby heat dissipation area of the outer wall surface of the pilot cone is increased and the pilot cone wall is cooled positively. Also, the air after having cooled the wall of the pilot cone flows out toward the outlet portion of the pilot cone, thereby flames existing therearound are prevented from staying there.

BRIEF DESCRIPTION OF THE DRAWINGS

FIG. 17 is a schematic cross sectional side view showing structure of a gas turbine combustor and a cooling system thereof in the prior art, wherein FIG. 17(*a*) and FIG. 17(*b*) show examples of air cooled system and FIG. 17(*c*) shows an example of steam cooled system.

DESCRIPTION OF THE PREFERRED EMBODIMENTS

Figure 1:
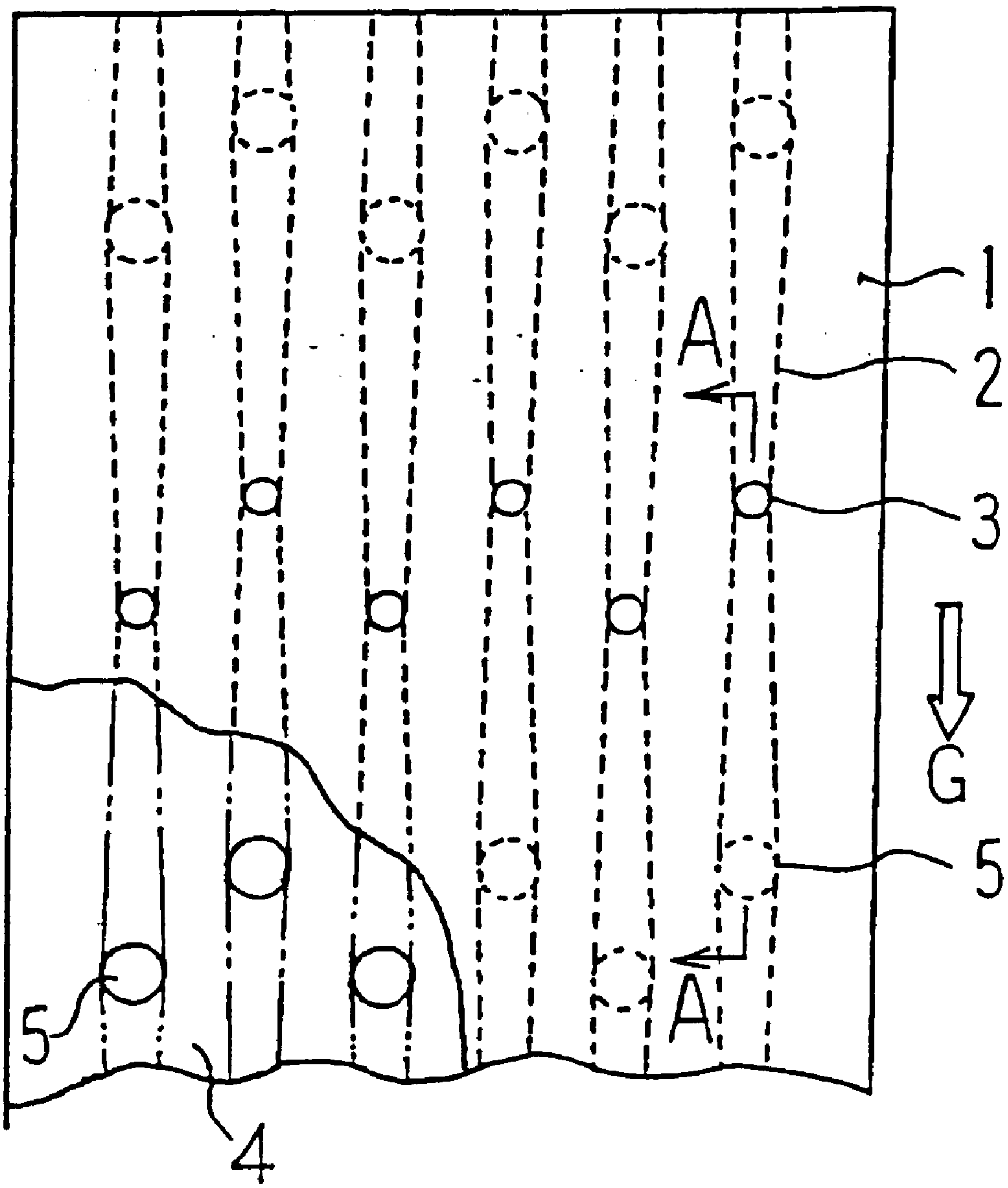
FIG. 1 is a partially cut away plan view of a portion of a wall of a gas turbine combustor cooling structure of a first embodiment according to the present invention.
Figure 2A:
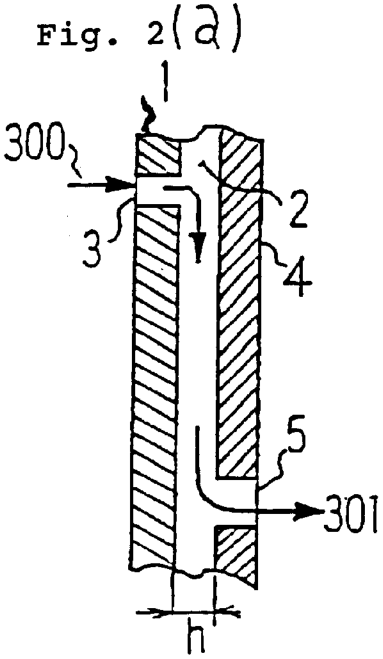
FIG. 2 is a cross sectional view taken on line A—A of FIG. 1, wherein FIG. 2(*a*) shows the wall having a constant cross sectional shape of groove, FIG. 2(*b*) shows the wall whose groove depth contracts toward an air outlet hole and FIG. 2(*c*) shows the wall whose groove depth enlarges toward the air outlet hole.
Figure 2B:
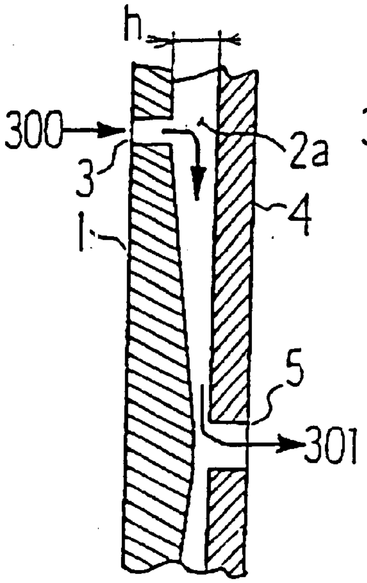
Figure 2C:
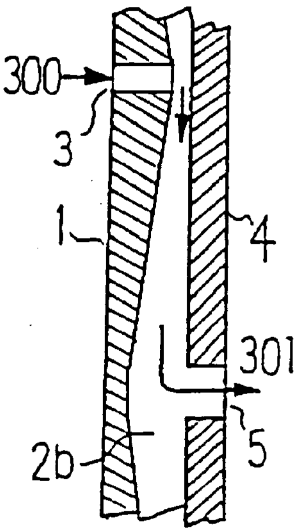

Herebelow, embodiments according to the present invention will be described concretely with reference to figures. FIG. 1 is a partially cut away plan view of a portion of a wall of a gas turbine combustor cooling structure of a first embodiment and FIG. 2 is a cross sectional view taken on line A—A of FIG. 1, wherein FIG. 2(*a*) shows the wall having a constant cross sectional shape of a groove therein and FIGS. 2(*b*) and 2(*c*) show modified forms thereof having changed cross sectional shapes of the grooves, respectively. The wall structure shown in FIG. 1 is applicable to a wall of the gas turbine combustor tail tubes 105, 110 in the prior art described with respect to FIGS. 17(*a*) and 17(*b*), wherein the combustor tail tubes are cooled by air.

In FIG. 1, numeral 1 designates an outer plate, which constitutes an outer wall surface of a tail tube. Numeral 2 designates a groove, which is provided in plural pieces in the outer plate 1 and has a cross sectional shape whose width changes like a tapered form. This tapered form is made linearly or in a smooth curve. An air inlet hole 3 is bored in plural pieces in the outer plate 1 so as to communicate with the groove 2 provided therein. Numeral 4 designates an inner plate, and an air outlet hole 5 is bored in plural pieces to pass therethrough. The inner plate 4 and the outer plate 1 are made of a heat resistant material, such as Hastelloy X, Tomilloy or SUS material, like in the prior art and, being lapped one on another so as to cover an opening side of the groove 2, are jointed together.

The air outlet hole 5 of the inner plate 4 is arranged so as to communicate with the groove 2 of the outer plate 1 and to position with a predetermined pitch from the air inlet hole 3 of the outer plate 1 between two of the air inlet holes 3 along the groove 2. Width of the groove 2 enlarges linearly toward the air outlet hole 5 from the air inlet hole 3 so that it is smallest at the position of the air inlet hole 3 and largest at the position of the air outlet hole 5. Thus, the groove 2 communicates with both holes 3, 5 in that form. The respective grooves 2 extend from an upstream side of the tail tube to a gas outlet side end portion thereof and are arranged in the circumferential wall of the tail tube with a predetermined pitch between the grooves 2, 3.4 mm pitch for example.

In the example of FIG. 2(*a*), the groove 2 is formed with a constant depth h on the outer plate 1 side of the jointing portion of the outer plate 1 and the inner plate 4 and while the depth h is constant, width thereof enlarges linearly as shown in FIG. 1. The air inlet hole 3 is bored in the outer plate 1, the air outlet hole 5 in the inner plate 5, and both holes 3, 5 are provided communicating with the groove 2. Diameter of the air outlet hole 5 is made larger than that of the air inlet hole 3 so that flowing out of the cooling medium is ensured and facilitated corresponding to the enlarged volume of the groove 2. Concrete dimensions of the above structure are, for example, about 3.2 mm thickness of the outer plate 1, about 0.6 mm thickness of the inner plate 4 and about 1.6 mm of the depth h.

In the example of FIG. 2(*b*), height of the groove 2*a* narrows linearly toward the air outlet hole 5 from the air inlet hole 3 and width thereof enlarges in a tapered form as shown in FIG. 1. Also, in FIG. 2(*c*), depth of the groove 2*b* is made narrow at the air inlet hole 3, reversely of the case of FIG. 2(*b*), to then enlarge in a tapered form to become larger at the air outlet hole 5 and width thereof also enlarges in a tapered form as shown in FIG. 1. It is to be noted that the mentioned tapered form changing in the depth direction also may be made linearly or in a smooth curve.

The examples of FIGS. 2(*b*) and 2(*c*) are those changing the shape of the groove 2 three-dimensionally, and cooling structures thereof can be designed by setting the tapered form appropriately so that flow velocity and pressure loss of cooling air flowing in the groove 2 may be adjustable according to the position and by setting the flow velocity and the pressure loss to appropriate values according to the distribution state of temperature and thermal stress in the tail tube. Processing of the groove 2, being hardly done by milling, is done by electro discharge machining or electrochemical machining.

As shown in FIGS. 1 and 2, cooling air 300 flows into the groove 2, 2*a* or 2*b* through the air inlet hole 3 provided in plural pieces in the circumferential wall of the tail tube to be separated to flow in mutually opposite directions for cooling of the wall and flows out of the air outlet hole 5 provided with equal intervals between the air holes in the groove direction to enter the tail tube. The air entering the air inlet hole 3 is of temperature of 350 to 400° C. and while cooling the wall, it is heated to become about 600° C. when it flows out into the tail tube.

While the air taken from the air inlet hole 3 flows through the groove 2, 2*a* or 2*b*, it is heated to expand to increase volume, so that flow velocity thereof increases at the air outlet hole 5 to thereby increase pressure loss of the air if the cross section of the groove is constant as in the prior art case. But in the present first embodiment, the cross sectional shape of the groove 2 enlarges two-dimensionally or three-dimensionally as it approaches the air outlet hole 5, hence the flow velocity is suppressed and the pressure loss can be reduced.

Figure 19:
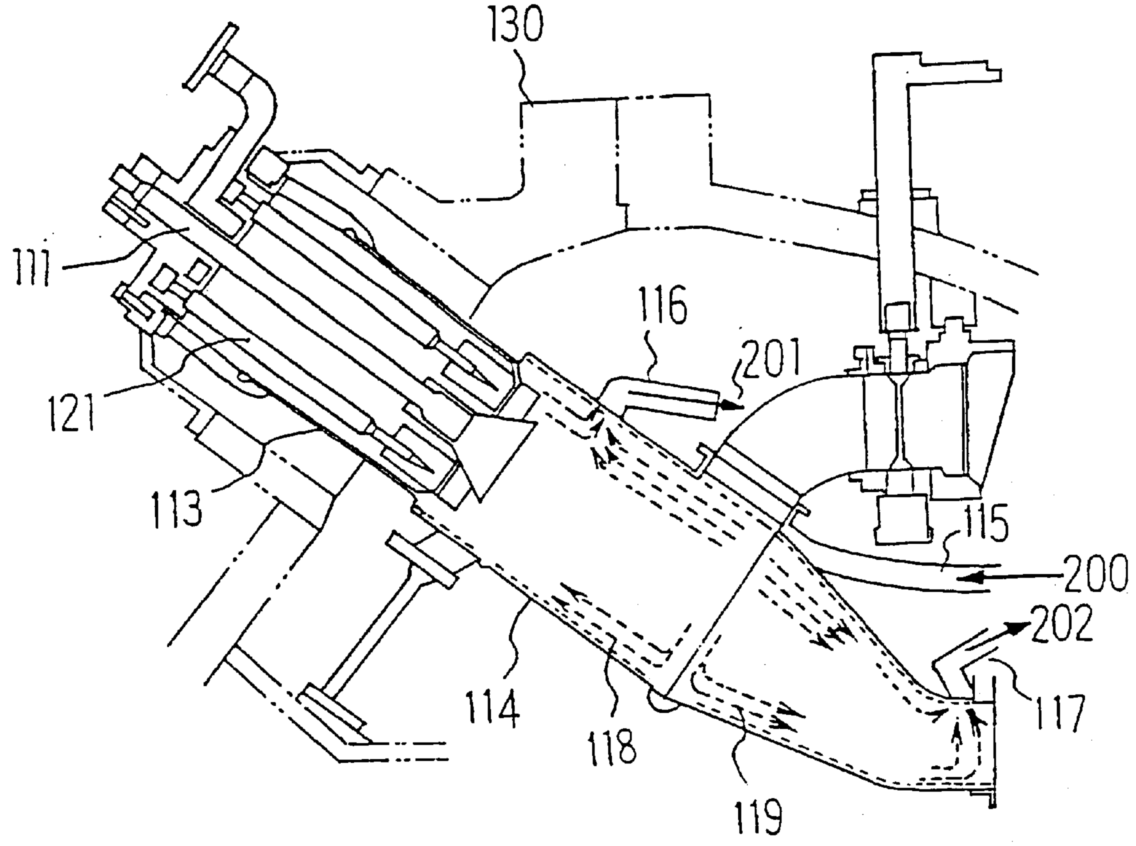
FIG. 19 is an enlarged cross sectional side view of the steam cooled type combustor shown in FIG. 17(*c*).

In the present first embodiment, although the example is described such that the air inlet hole 3 and the air outlet hole 5 are provided in plural pieces, respectively, and the cross sectional shape of the groove 2, 2*a* or 2*b* changes two-dimensionally or three-dimensionally, the cross sectional shape of the groove shown in FIGS. 1 and 2 may be also applied as the cross sectional shape of the steam cooled groove in the steam cooled system having no air inlet or outlet hole but having the steam supply passage 115 and the steam recovery passages 116, 117, as shown in FIG. 17(*c*) or FIG. 19, and in this case also, the same effect as in the air cooled system can be obtained.

Figure 3:
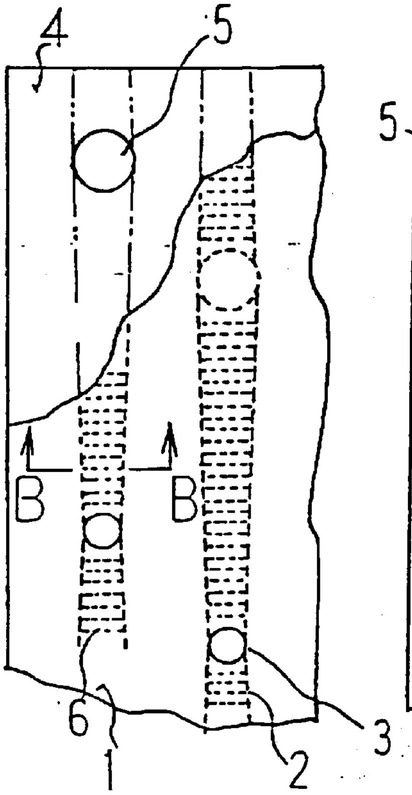
FIG. 3 is a partially cut away plan view of a portion of a wall of a gas turbine combustor cooling structure of a second embodiment according to the present invention, wherein FIG. 3(*a*) shows an example having turbulators in a groove and FIG. 3(*b*) shows an example having recess portions in the groove.
Figure 3:
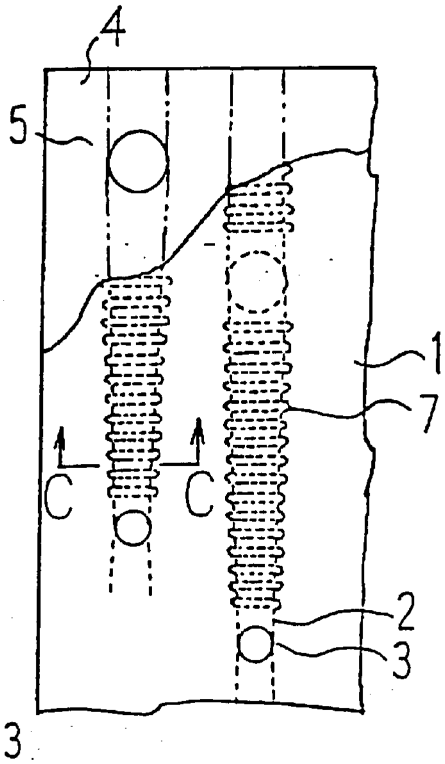

FIG. 3 is a partially cut away plan view of a portion of a wall of a gas turbine combustor cooling structure of a second embodiment, wherein FIG. 3(*a*) shows an example having turbulators in a groove and FIG. 3(*b*) shows an example having recess portions in a groove. In FIG. 3, numerals 1 to 5 designate same parts, respectively, as those of the first embodiment shown in FIGS. 1 and 2. The cooling structure of FIG. 3(*a*) has a turbulator 6 provided in plural pieces projecting from an inner wall surface of the groove 2 and being arranged orthogonally to flow direction of cooling air, thereby the flow of the cooling air is agitated and the heat transfer rate is enhanced. The example of FIG. 3(*b*) has a recess portion 7, in place of the turbulator 6, provided in plural pieces being formed recessedly in the inner wall surface of the groove 2, thereby the flow of the cooling air is likewise agitated and the heat transfer rate is enhanced. It is to be noted that said turbulator 6 or recess portion 7 may be provided along the entire length of the groove 2 or partly according to needed sections.

Figure 4A:
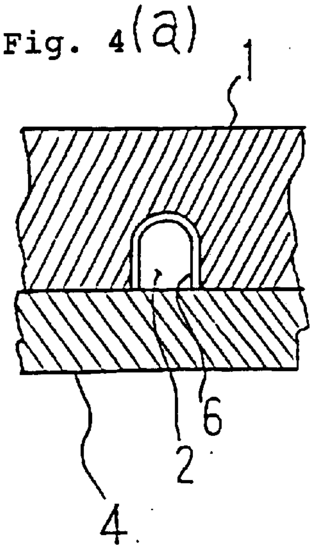
FIG. 4 is an enlarged cross sectional view of the groove of FIG. 3, wherein FIG. 4(*a*) is a cross sectional view taken on line B—B of FIG. 3(*a*) and FIG. 4(*b*) is a cross sectional view taken on line C—C of FIG. 3(*b*).
Figure 4B:
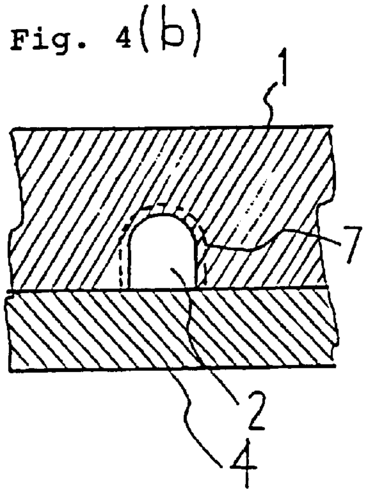

FIG. 4 is an enlarged cross sectional view of the groove 2 of FIG. 3, wherein FIG. 4(*a*) is a cross sectional view taken on line B—B of FIG. 3(*a*) and FIG. 4(*b*) is a cross sectional view taken on line C—C of FIG. 3(*b*). As shown in FIG. 4(*a*), the turbulator 6 is formed along the inner wall surface of the groove 2, projecting therefrom. Also, in FIG. 4(*b*), the recess portion 7 is formed along the inner wall surface of the groove 2, being recessed therein. By so providing the turbulator 6 or the recess portion 7 orthogonally to the flow direction of the cooling air, the flow thereof becomes turbulent and the heat transfer rate is enhanced.

In the first embodiment shown in FIGS. 1 and 2, the cross sectional shape of the groove 2 enlarges gradually toward the air outlet hole 5 from the air inlet hole 3 to thereby suppress an increase of the flow velocity caused by the thermal expansion of the cooling air and to reduce the pressure loss, but on the other hand, cooling performance near the air outlet hole 5 is reduced. In the present second embodiment, the turbulator 6 or the recess portion 7 is provided so as to enhance the heat transfer rate, thereby the cooling performance being so reduced can be made up. It is to be noted that the structure of the second embodiment may be applied also to the groove of the steam cooled system shown in FIG. 19.

Figure 5:
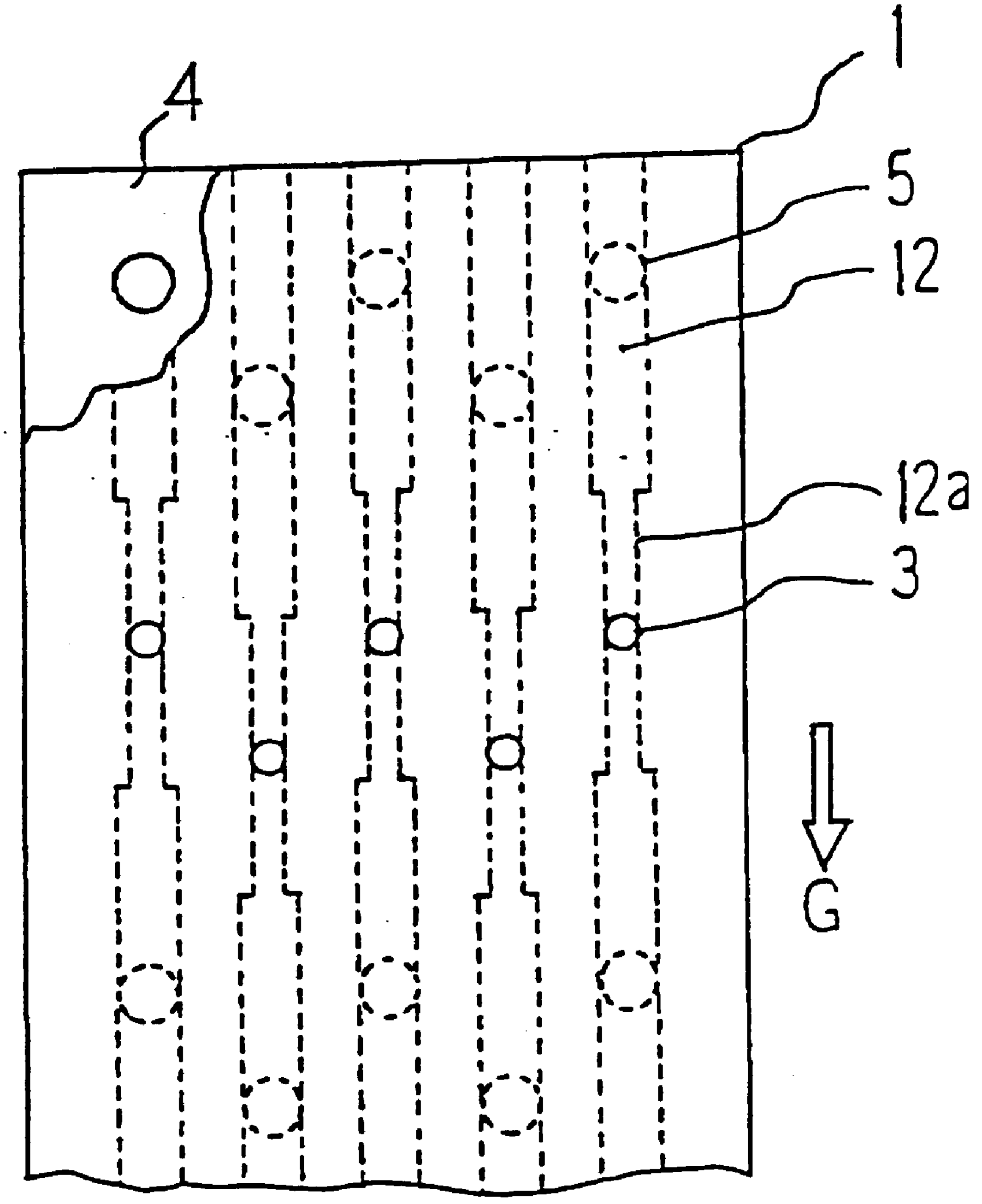
FIG. 5 is a partially cut away plan view of a portion of a wall of a gas turbine combustor cooling structure of a third embodiment according to the present invention.

FIG. 5 is a partially cut away plan view of a portion of a wall of a gas turbine combustor cooling structure of a third embodiment. In FIG. 5, an air inlet hole 3 is bored in plural pieces in the outer plate 1, like in the prior art case. While a groove 12 is also provided in plural pieces in the outer plate 1, the cross sectional shape of the groove 12 is made in two constant forms that is, one being formed in an orifice 12*a* having a narrower width in a predetermined length on both sides in the flow direction of cooling air of the air inlet hole 3 and the other having a wider width on an air outlet hole 5 side, said air outlet hole 5 being bored in the inner plate 4, like in the prior art case.

In the third embodiment so constructed as above, cooling air flowing around an outer circumference of the tail tube enters the air inlet hole 3 to flow into the orifice 12*a* of the groove 12. Then, the air is separated to flow in mutually opposite directions along the groove 12 toward the air outlet holes 5, respectively, for cooling of the wall, and while the air is heated to expand, width of the groove 12 enlarges near the air outlet hole 5 to increase the cross sectional area of the groove 12, thereby increase of the flow velocity of the air is suppressed, increase of the pressure loss is prevented and the same effect as that of the first embodiment can be obtained.

In the third embodiment of FIG. 5, while the cross sectional shape of the groove 12 is described as having the two constant forms, it may be changed to enlarge gradually two-dimensionally in a depth direction of the groove 12 toward the air outlet hole 5. Also, if the turbulator or recess portion is provided in the groove 12, the heat transfer rate is enhanced and the cooling performance can be improved. Further, needless to mention, the structure of the third embodiment may be applied to the groove shape of the steam cooled system shown in FIG. 19 and the same effect can be obtained.

Figure 6A:
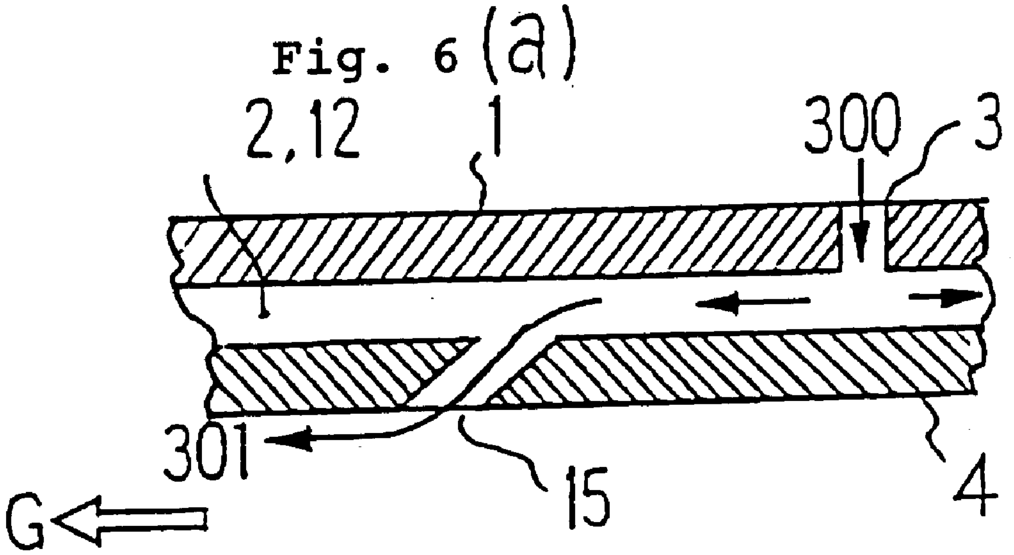
FIG. 6 is a cross sectional view of a wall of a gas turbine combustor cooling structure of a fourth embodiment according to the present invention, wherein FIG. 6(*a*) shows an example having an air outlet hole provided obliquely and FIG. 6(*b*) shows an example having a cover provided at an outlet portion of the air outlet hole.
Figure 6B:
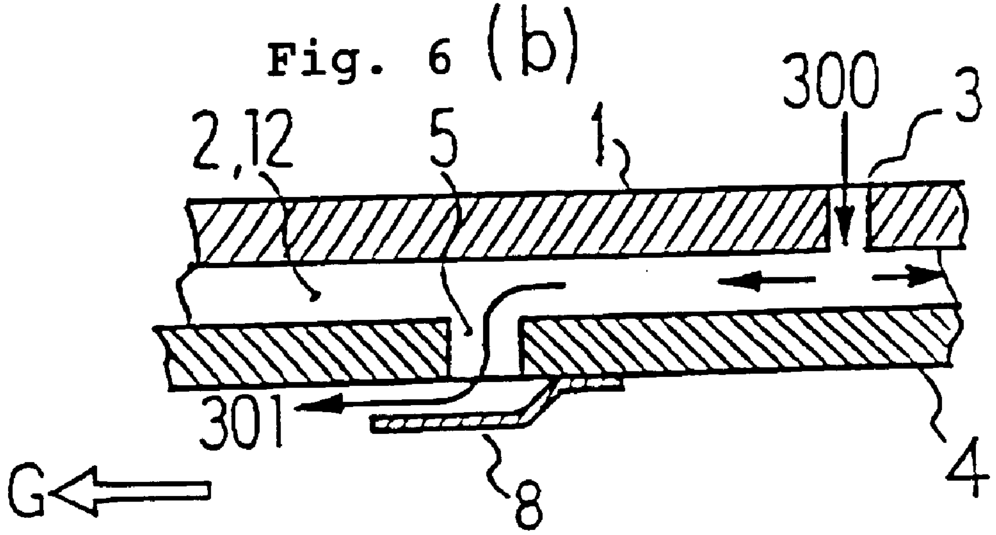

FIG. 6 is a cross sectional view of a wall of a gas turbine combustor cooling structure of a fourth embodiment, wherein FIG. 6(*a*) shows an example having an air outlet hole provided obliquely and FIG. 6(*b*) shows an example having a cover provided at an outlet portion of the air outlet hole. In FIG. 6(*a*), what is different from the first and second embodiments shown in FIGS. 1 and 2 and the third embodiment shown in FIG. 5 is a structure having an air outlet hole 15 provided obliquely to a combustion gas flow direction G and other portions are same as those shown in FIGS. 1, 2 and 5.

In this structure, cooling air 300 around the tail tube enters the groove 2 or 12 through the air inlet hole 3 to flow therein for cooling of the wall and flows out of the air outlet hole 15 obliquely into the tail tube. Then, the air flows along the inner plate 4 in the combustion gas flow direction G, hence the wall surface near the air outlet hole 15 is cooled and the cooling effect is increased.

In FIG. 6(*b*), air outlet hole 5 is not such an inclined one as the air outlet hole 15 but the same hole as those of FIGS. 1, 2 and 5 and has a cover 8 provided at the outlet portion. Construction of other portions is same as that shown in FIGS. 1, 2 and 5. In this structure also, air flowing out of the air outlet hole 5 into the tail tube flows in the combustion gas flow direction G along the inner plate 4, hence the same effect as that of FIG. 6(*a*) can be obtained and the cooling effect is enhanced.

Figure 7:
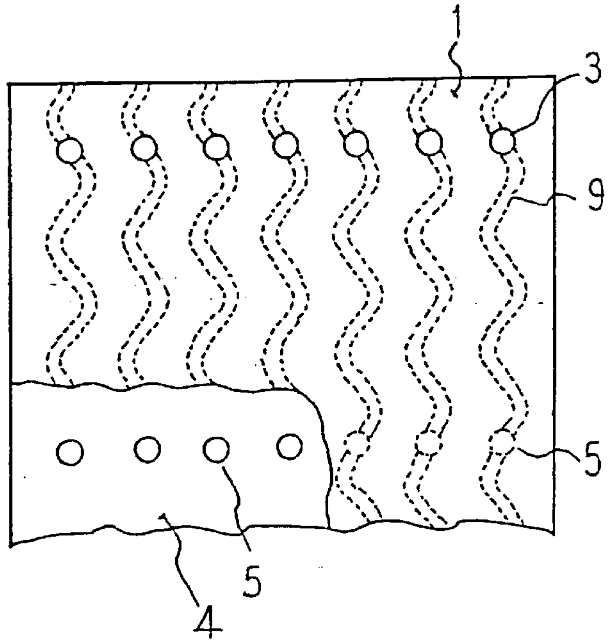
FIG. 7 is a partially cut away plan view of a portion of a wall of a gas turbine combustor cooling structure of a fifth embodiment according to the present invention.
Figure 8:
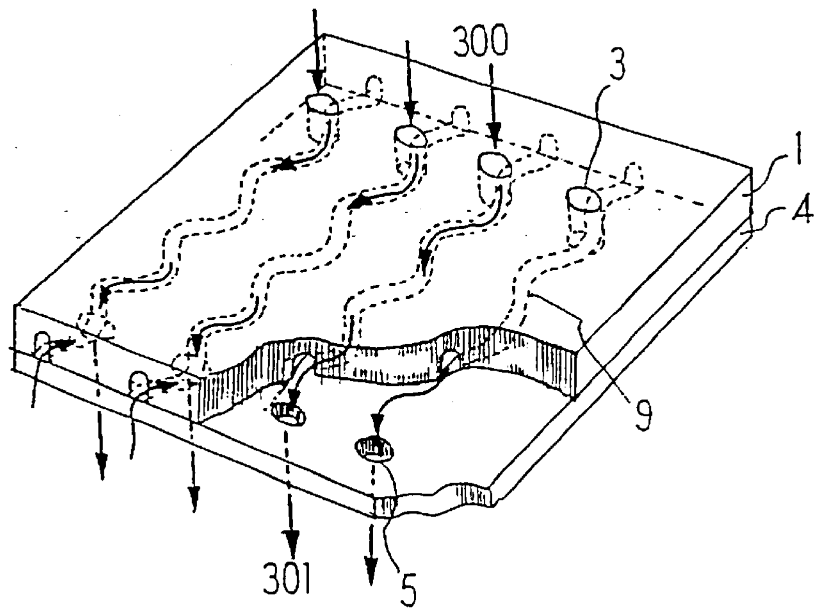
FIG. 8 is a partially cut away perspective view of the wall of FIG. 7.

FIG. 7 is a partially cut away plan view of a portion of a wall of a gas turbine combustor cooling structure of a fifth embodiment and FIG. 8 is a partially cut away perspective view of the wall of FIG. 7. In FIGS. 7 and 8, an air inlet hole 3 is bored in plural pieces in the outer plate 1 and a groove 9 is provided in plural pieces therein. Also, an air outlet hole 5 or 15 is bored in plural pieces in the inner plate 4. The groove 9 is formed in a wave shape of S letter form as shown there and communicates with the air inlet hole 3 and the air outlet hole 5 or 15. The air outlet hole 5 or 15 is arranged on the respective sides of the air inlet hole 3 in the groove 9 direction with an equal interval from the air inlet hole 3.

In the fifth embodiment constructed as above, cooling air flows into the groove 9 from around the outer circumference of the tail tube through the air inlet hole 3 to flow in the wave shape of S letter form for cooling of the wall and flows out of the air outlet hole 5 or 15 into the tail tube. Because the groove 9 is made in the wave shape, flow length of the groove 9 becomes longer than a groove of linear form and cooling passage thereof can be made longer, especially in a short section of the length, thereby designing to obtain a necessary cooling effect with the minimum cooling air becomes possible, adjustment of the flow velocity, pressure loss and heat transfer rate of the cooling air can be done to the temperature distribution and cooling passage length, the thermal stress is mitigated so as to prevent cracks, etc. and reliability can be enhanced.

It is to be noted that the turbulator 6 or the recess portion 7 shown in FIGS. 7 and 8 may be provided in the groove 9 shown in FIGS. 7 and 8 and also the orifice 12*a* shown in FIG. 5 may be provided in a given section on both sides of the air inlet hole in the groove direction, or a two-dimensional or three-dimensional cross sectional change shown in FIG. 1 may be provided, as the case may be. Also, the shape of the groove 9 may be applied to the steam passage of the steam cooled system shown in FIG. 19 and the same effect can be obtained.

Figure 9:
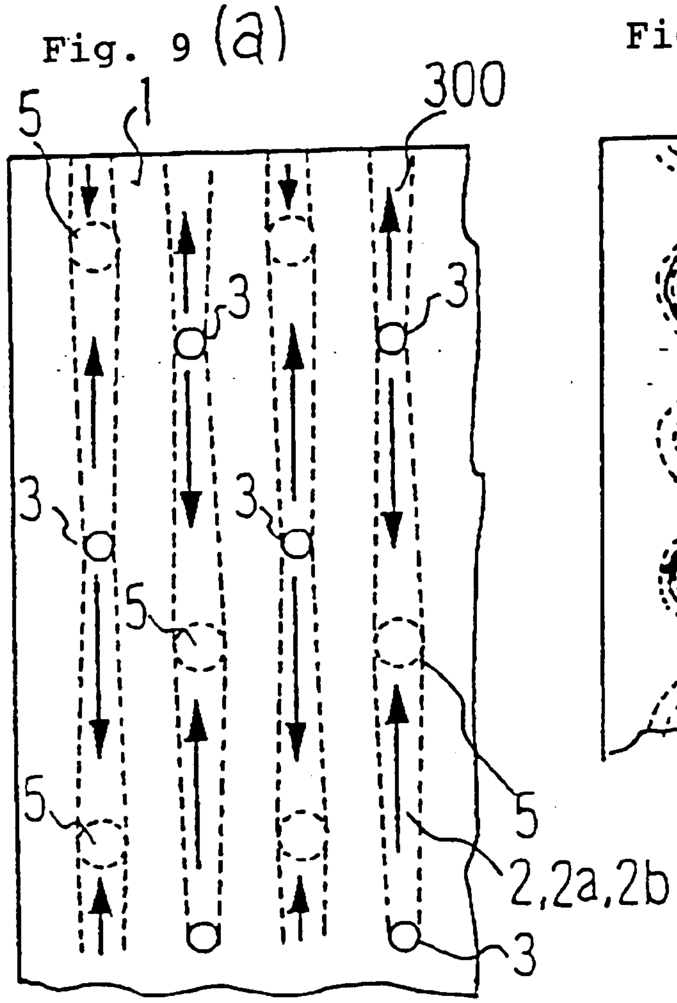
FIG. 9 is a plan view of a portion of a wall of a gas turbine combustor cooling structure of a sixth embodiment according to the present invention, wherein FIG. 9(*a*) shows an example having a groove of linear shape and FIG. 9(*b*) shows an example having a groove of wave shape.
Figure 9:
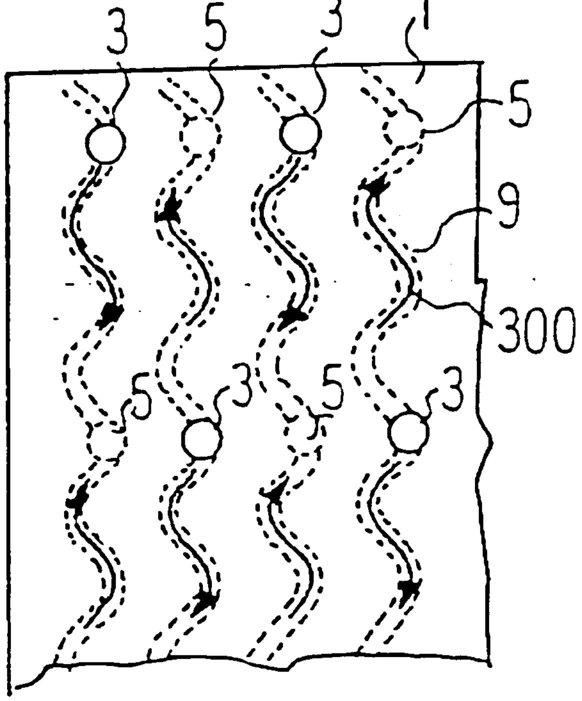

FIG. 9 is a plan view of a portion of a wall of a gas turbine combustor cooling structure of a sixth embodiment, wherein FIG. 9(*a*) shows an example having a groove of linear shape and FIG. 9(*b*) shows an example having a groove of wave shape. The example of FIG. 9(*a*) is constructed such that the structure of FIG. 1 is modified so that an air inlet hole 3 and an air outlet hole 5 are arranged adjacently to each other between mutually adjacent grooves 2 and two flow directions of cooling air 300 flowing in the mutually adjacent grooves 2 are opposite to each other.

Also, the example of FIG. 9(*b*) is constructed such that an air inlet hole 3 and an air outlet hole 5 are arranged adjacently to each other between mutually adjacent grooves 9 so that two flow directions of cooling air flowing in the mutually adjacent grooves 9 are opposite to each other. It is to be noted that although not illustrated, the structure shown in FIG. 5 also may be constructed so that cooling air flows in the same way as in FIG. 9. Further, the examples of FIG. 9 may be provided with the turbulator 6 or the recess portion 7 shown in FIG. 2 and also provided with the air outlet hole 15 or the cover 8 shown in FIG. 6.

In the sixth embodiment constructed as above, the cooling air 300 flows oppositely to each other between the mutually adjacent grooves, thereby entire portion of the wall can be cooled uniformly, temperature distribution is made uniform in the cooling of the tail tube and imbalance of thermal stress occurrence is dissolved. It is to be noted that the cooling structure shown in FIG. 9 may be applied also to the steam passage in the steam cooled system shown in FIG. 19 such that cooling steam flows oppositely to each other between mutually adjacent steam passage to thereby dissolve imbalance in the cooling.

Figure 10A:
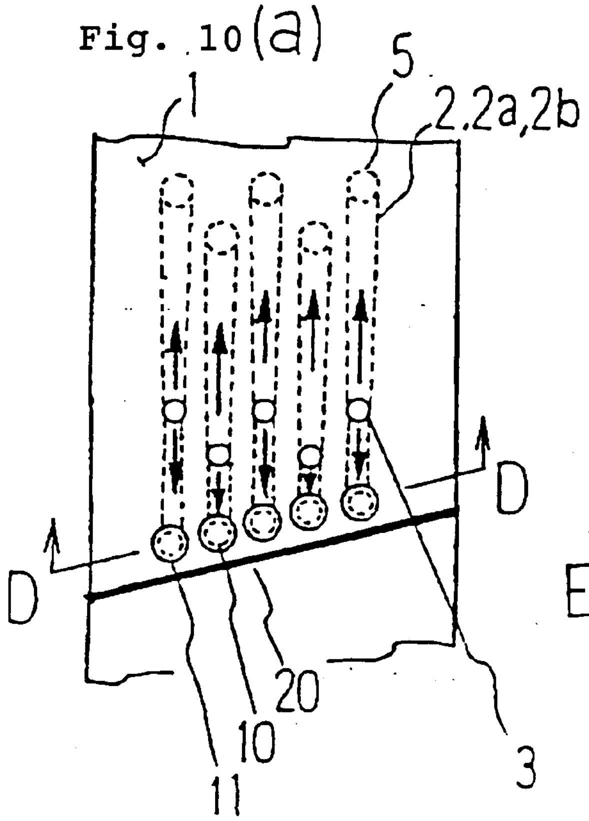
FIG. 10 is a plan view of a portion of a wall of a gas turbine combustor cooling structure of a seventh embodiment according to the present invention, wherein FIG. 10(*a*) shows an example where an air outlet hole is provided at a connecting portion of the wall and FIG. 10(*b*) shows an example where an air inlet hole is provided at the connecting portion of the wall.
Figure 10B:
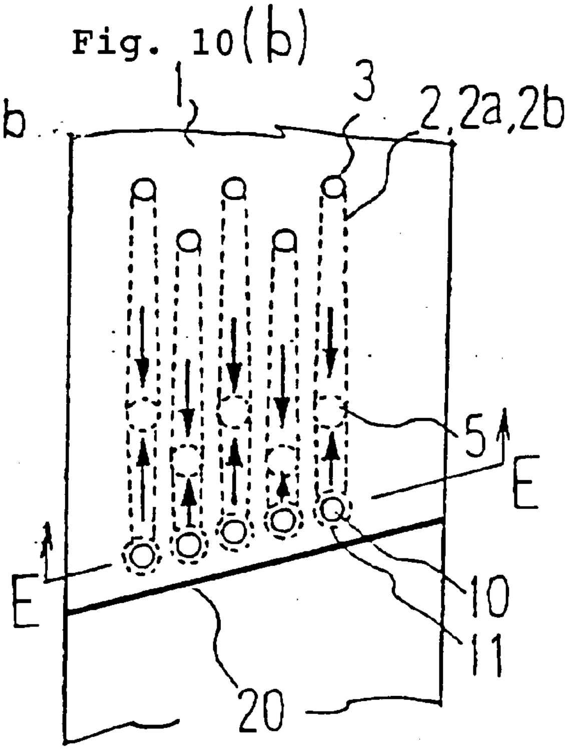

FIG. 10 is a plan view of a portion of a wall of a gas turbine combustor cooling structure of a seventh embodiment, wherein FIG. 10(*a*) shows an example where an air outlet hole is provided at a connecting portion of the wall and FIG. 10(*b*) shows an example where an air inlet hole is provided at the connecting portion of the wall. These cooling structures of the connecting portion of the wall may be applied to all the welded connecting portions of wall in the cooling structures of the first to sixth embodiments described above.

In FIG. 10(*a*), numeral 20 designates the connecting portion, wherein the walls constituting the tail tube are connected together by welding to form the tail tube. A groove 2 is formed in plural pieces in an outer plate 1 and an air inlet hole 3 is arranged in plural pieces with a predetermined hole to hole pitch along the groove direction. In an inner plate 4 which is jointed to the outer plate 1, an air outlet hole 5 is arranged in plural pieces on both sides of the air inlet hole 3 along the groove direction with a predetermined pitch from the air inlet hole 3. Thus, at the connecting portion 20, these holes 3, 5 are not always arranged with the predetermined dimensions relative to an end of the groove 2.

As shown in FIG. 10(*a*), a through hole 10 is bored at an end of the groove 2 in the connecting portion 20 of the wall so as to pass through the outer plate 1 and the inner plate 4. Cooling air flows into the through hole 10 from the air inlet hole 3 and in order to cause this cooling air to flow into the tail tube, a cover 11 is put insertedly into the through hole 10 from outside of the outer plate 1 to close the outer side thereof. Thus, the air flows toward the opposite inner plate 4 side to flow into the tail tube from the end of the groove 2.

Figure 11A:
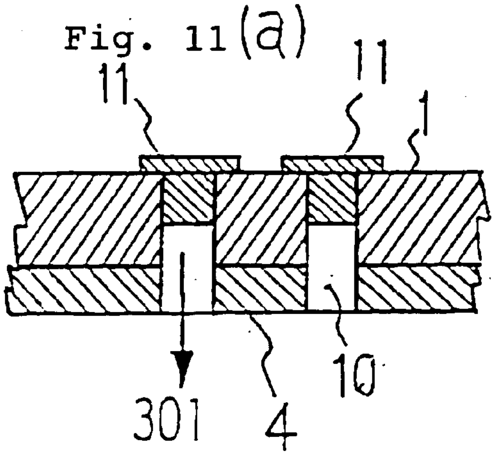
FIG. 11 is an enlarged cross sectional view of a portion of FIG. 10, wherein FIG. 11(*a*) is that taken on line D—D of FIG. 10(*a*) and FIG. 11(*b*) is that taken on line E—E of FIG. 10(*b*).
Figure 11B:
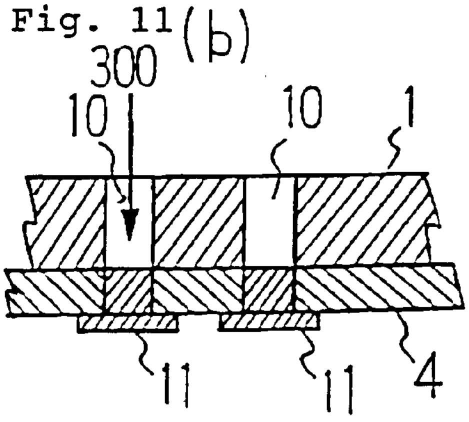

FIG. 11 is an enlarged cross sectional view of a portion of FIG. 10, wherein FIG. 11(*a*) is that taken on line D—D of FIG. 10(*a*) and FIG. 11(*b*) is that taken on line E—E of FIG. 10(*b*).

In FIG. 11(*a*), the through hole 10 is bored passing through the outer plate 1 and the inner plate 4 and the cover 11 is put insertedly into the outer plate 1 portion of the through hole 10 so that the cooling air flowing through the groove 2 flows toward the inner plate 4 side to flow out into the tail tube from the end of the groove 2 as air 301.

In FIG. 10(*b*), a through hole 10 is likewise provided at the end of the groove 2 in the connecting portion 20 of the wall. The through hole 10 communicates with the groove 2 and an air outlet hole 5 is provided upstream of the through hole 10 in the groove 2 direction, and it is intended that cooling air entering the through hole 10 flows out of this upstream air outlet hole 5 into the tail tube. For this purpose, a cover 11 is put insertedly into the through hole 10 from the inner plate 4 side, so that the cooling air entering the through hole 10 at the end of the groove 2 from around the tail tube flows through the groove 2 and flows out of the upstream air outlet hole 5 into the tail tube.

In FIG. 11(*b*), the through hole 10 is bored passing through the outer plate 1 and the inner plate 4, the cover 11 is put insertedly into the inner plate 4 portion and the air 300 flows into the through hole 10 from around the outer circumference of the tail tube to flow through the groove 2.

By employing the structure of the connecting portion of the seventh embodiment to be applied to the gas turbine combustor cooling structure, the cooling air flows through all the end portions of the grooves in the connecting portion of the tail tube wall, thereby the wall of the connecting portion 20 can be cooled uniformly.

Figure 12:
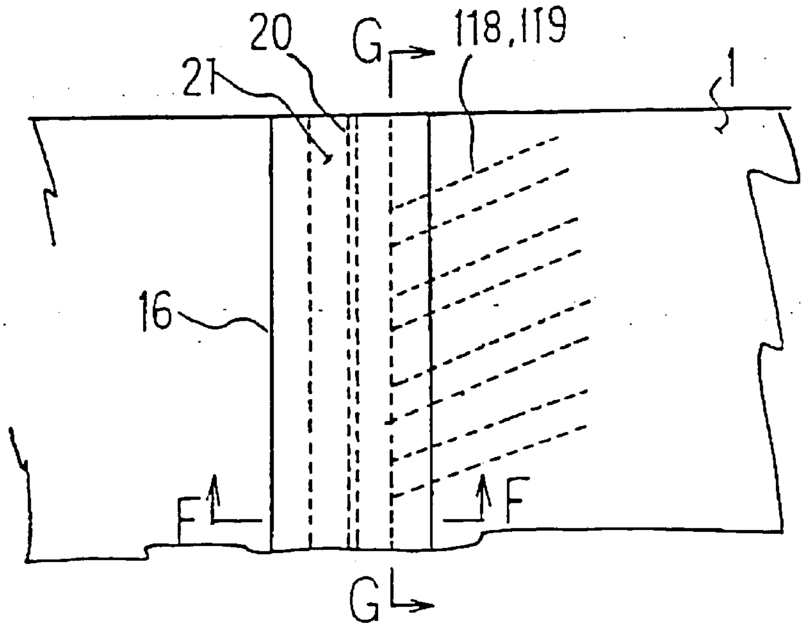
FIG. 12 is a plan view of a wall connecting portion of a gas turbine combustor cooling structure of an eighth embodiment according to the present invention.

FIG. 12 is a plan view of a wall connecting portion of a gas turbine combustor cooling structure of an eighth embodiment. This embodiment is an example applied to a tail tube of a steam cooled system. In FIG. 12, numeral 20 designates a connecting portion of inner plates 1 which are connected together by welding to form the tail tube. Steam passages 118, 119 are provided in plural pieces, respectively, in an outer plate 1 and as described in FIG. 19, steam 200 is supplied to flow through these steam passages 118, 119 from the steam supply passage 115. While the steam flows through these steam passages 118, 119, it cools the wall and the steam heated thereby gathers in the steam recovery passages 201, 202 to be recovered. Hence, the steam passages 118, 119 need to communicate with downstream side steam passages (not shown) at the connecting portion 20 of the wall and for this purpose, a connecting portion groove 21 is formed in the connecting portion 20 of the wall so that the respective steam passages 118, 119 communicate with the connecting portion groove 21.

Figure 13A:
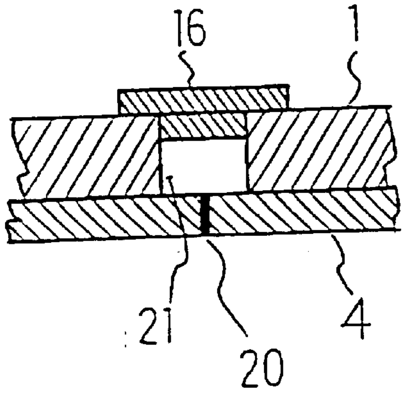
FIG. 13 is an enlarged cross sectional view of a portion of FIG. 12, wherein FIG. 13(*a*) is that taken on line F—F of FIG. 12 and FIG. 13(*b*) is that taken on line G—G of FIG. 12.
Figure 13B:
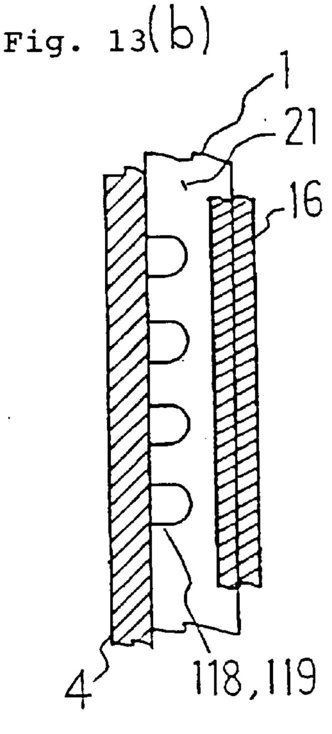

FIG. 13 is an enlarged cross sectional view of a portion of FIG. 12, wherein FIG. 13(*a*) is that taken on line F—F of FIG. 12 and FIG. 13(*b*) is that taken on line G—G of FIG. 12. In FIG. 13, inner plates 4 are connected together by welding to form the connecting portion 20 and the connecting portion groove 21 is formed with a predetermined width in the connecting portion 20 of the inner plates 1. A cover 16 is put insertedly into the connecting portion groove 21 from the outer plate 1 side to close the groove to form a steam reservoir therein. The steam entering the connecting portion groove 21 from the plural steam passages 118, 119 is then supplied or recovered into the steam passages (not shown) in the adjacent walls.

The connecting portion of the eighth embodiment described above may be applied to wall connecting portions of the gas turbine combustor cooling structure of the steam cooled system having the cross sectional shapes and groove arrangements of the first to third, fifth and sixth embodiments, and the structure of the steam passages in the connecting portion can be made in a simple form.

Figure 14:
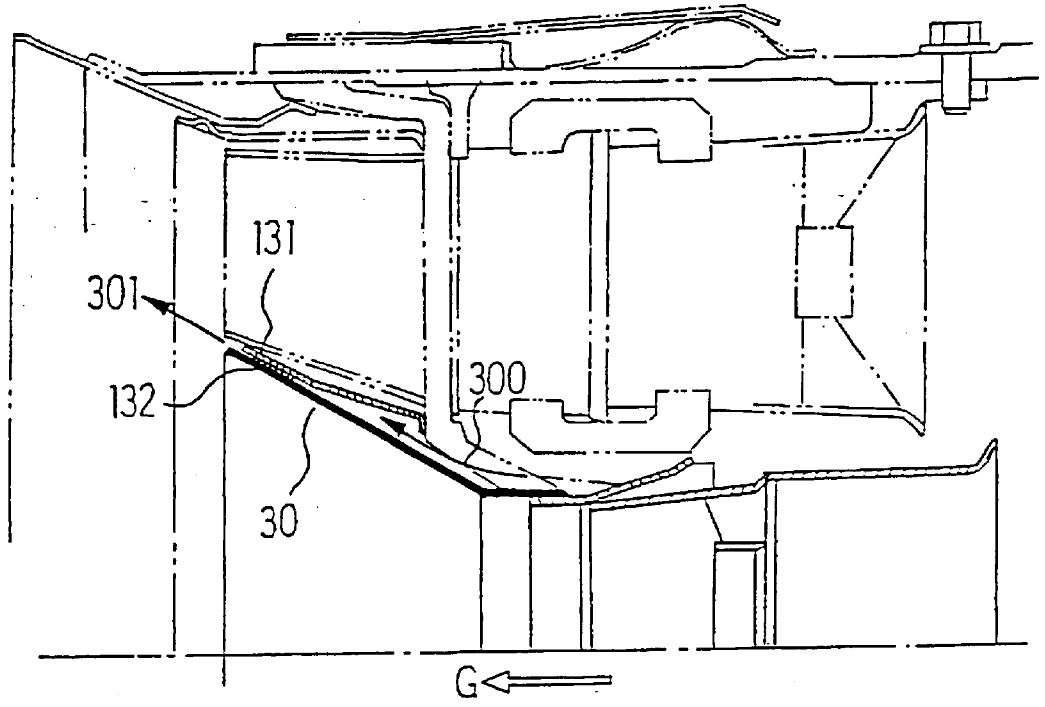
FIG. 14 is a cross sectional side view of an upper half portion of a gas turbine combustor pilot cone cooling structure of a ninth embodiment according to the present invention.
Figure 20:
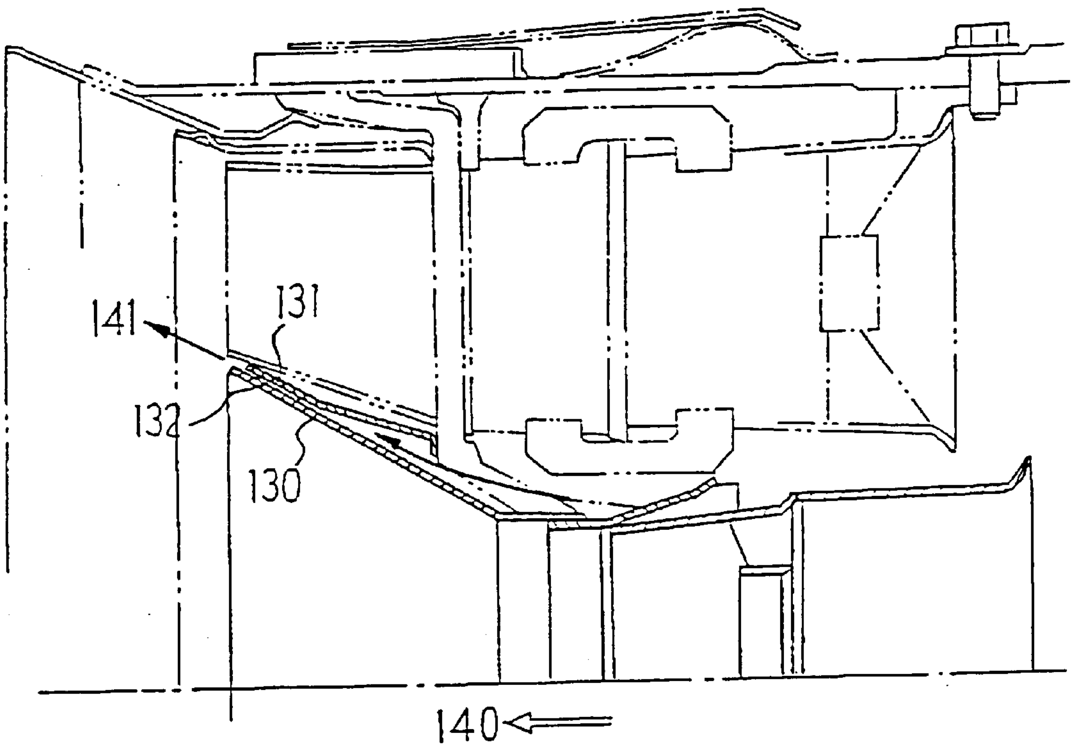
Fig. 20 (Prior Art)
FIG. 20 is a cross sectional side view of an upper half portion of a pilot cone of the gas turbine combustor in the prior art.

FIG. 14 is a cross sectional side view of an upper half portion of a gas turbine combustor pilot cone cooling structure of a ninth embodiment. This cooling structure is applied to a wall of the pilot cone, described in FIG. 20, of the combustors shown in FIG. 17(*b*) and 17(*c*). In FIG. 14, numeral 30 designates a pilot cone, and the cooling structure of the present invention is applied to a wall of the pilot cone 30. Numeral 131 designates a guide ring, which is the same one as that in the prior art to support the wall of the pilot cone 30 at the connecting portion 132. Numeral 300 designates cooling air, which flows along an outer surface of the wall of the pilot cone 30 in the flow direction of the pilot combustion gas G for cooling of the wall and flows out as shown by arrow 301. The cooling structure of the ninth embodiment is constructed by any one of the cooling structures of the first to eighth embodiments shown in FIGS. 1 to 11 being applied to the wall of the pilot cone 30. That is, while the cooling structures of the first to eighth embodiments are applied to the wall of the combustor tail tube, etc. as the high temperature portions to be cooled of the gas turbine combustor, the cooling structure of the ninth embodiment is constructed by the same cooling structures being applied to the wall of the pilot cone likewise as the high temperature portion to be cooled of the gas turbine combustor, because the basic structure to effect the cooling can be commonly applied to the ninth embodiment as well.

Therefore, if the wall of the pilot cone 30 of FIG. 14 is shown in a plan view, it is same as the plan views of the wall shown in FIGS. 1 to 11 and the description thereon is also same and is omitted.

Figure 15A:
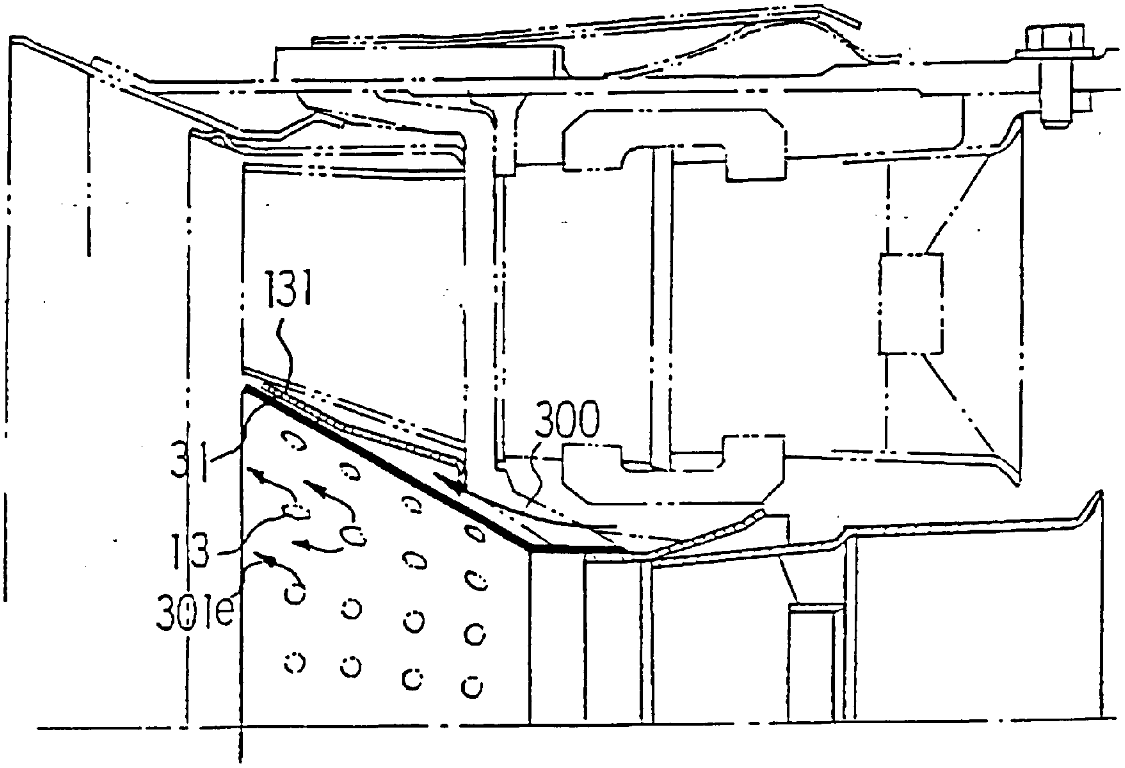
FIG. 15 is a cross sectional side view of an upper half portion of a gas turbine combustor pilot cone cooling structure of a tenth embodiment according to the present invention, wherein FIG. 15(*a*) is the cross sectional view and FIG. 15(*b*) is an enlarged cross sectional view of a wall of the pilot cone.
Figure 15B:
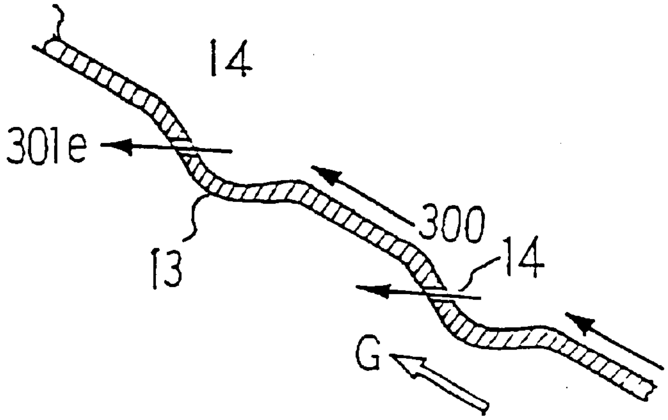

FIG. 15 is a cross sectional side view of an upper half portion of a gas turbine combustor pilot cone cooling structure of a tenth embodiment, wherein FIG. 15(*a*) is the cross sectional view and FIG. 15(*b*) is an enlarged cross sectional view of a wall of the pilot cone. In FIG. 15(*a*), numeral 31 designates a pilot cone, which is supported at its outer wall surface by the guide ring 131, like in the prior art. In the wall of the pilot cone 31, there are formed a multiplicity of dimples 13 projecting in a conical shape toward an inner side of the pilot cone 31 and a hole 14 is bored obliquely in a wall of the conical shape each of the dimples 13 so that air 301*e* flows out of the hole 14 toward a flow direction of pilot combustion gas G.

In FIG. 15(*b*), air 300 flows along the outer wall surface of the pilot cone 31 for cooling of the wall to flow out of an outlet portion of the pilot cone 31, like in the prior art case. In this process of flow of the cooling air, a portion thereof flows into an inner side of the pilot cone 31 through the hole 14 of the dimple 13 to form a film layer of the cooling air on the inner wall surface, thereby a film cooling is carried out and the cooling effect of the wall can be enhanced.

Figure 16:
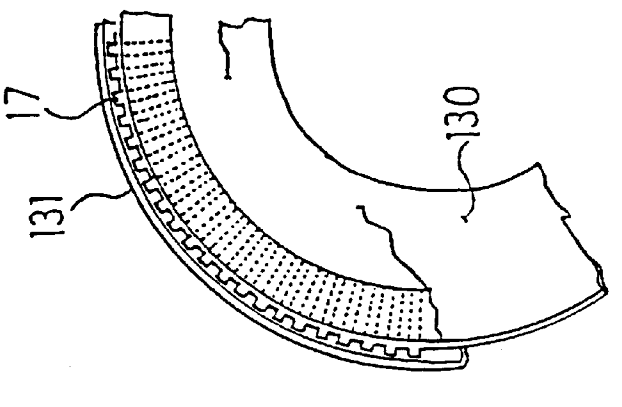
FIG. 16 is a cross sectional side view of a gas turbine combustor pilot cone cooling structure of an eleventh embodiment according to the present invention, wherein FIG. 16(*a*) is the cross sectional view and FIG. 16(*b*) is a view seen from plane F—F of FIG. 16(*a*).
Figure 16:
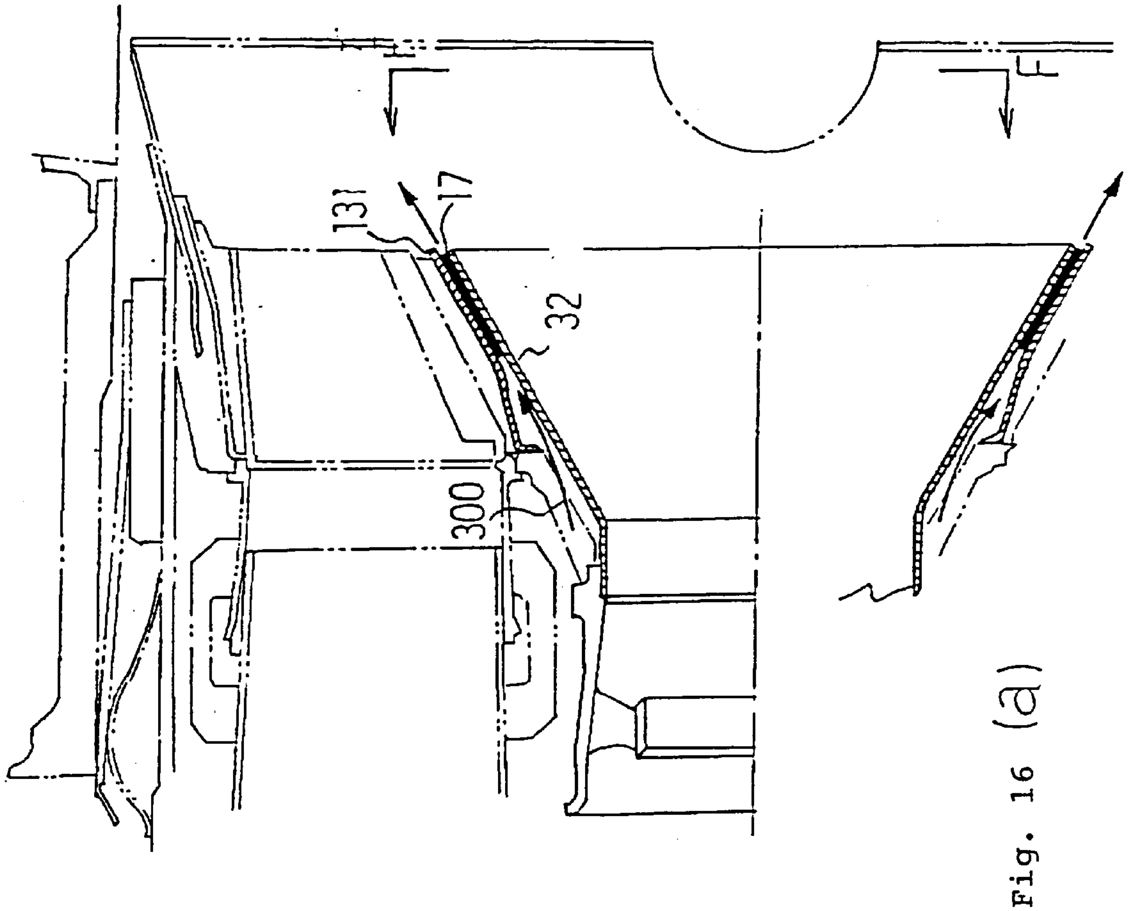
Figure 18:
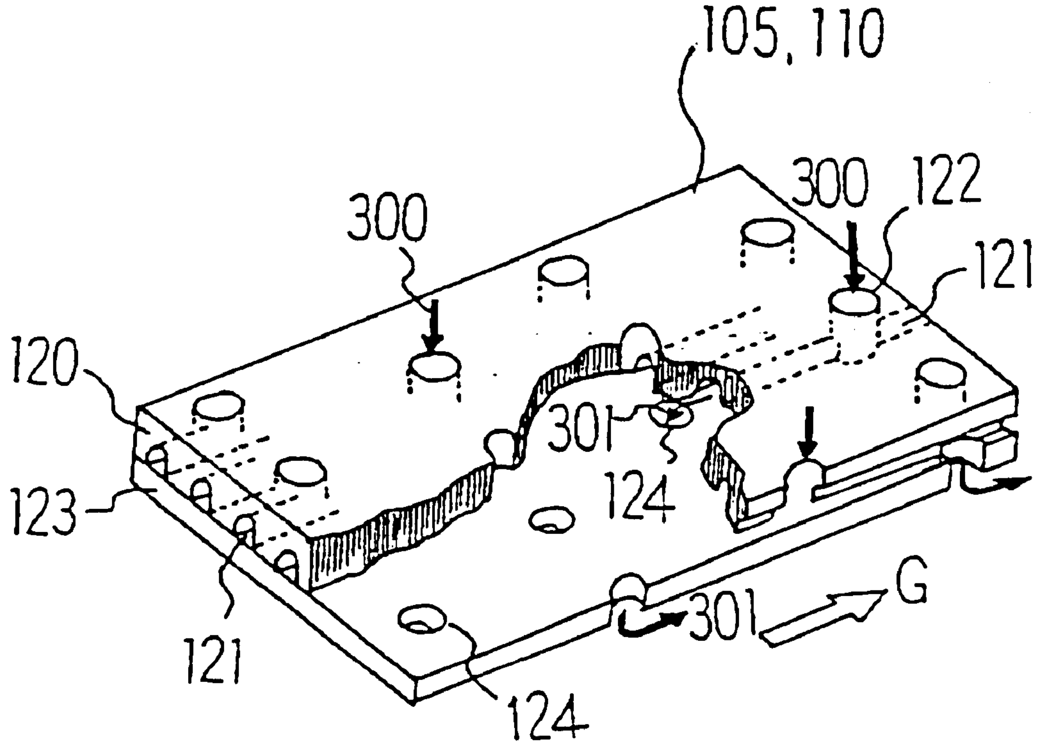
Fig. 18 (Prior Art)
FIG. 18 is a partially cut away perspective view of a tail tube wall structure of the gas turbine combustor of the air cooled system in the prior art.

FIG. 16 is a cross sectional side view of a gas turbine combustor pilot cone cooling structure of an eleventh embodiment, wherein FIG. 16(*a*) is the cross sectional view and FIG. 16(*b*) is a view seen from plane F—F of FIG. 16(*a*). In FIG. 16, numeral 32 designates a pilot cone and numeral 131 designates a guide ring, which is the same as that of the prior art. In the present eleventh embodiment, a plurality of fins 17 are provided projecting on an outer wall surface of the pilot cone 32 along a front and rear direction of the pilot cone 32 and the guide ring 131 supports the pilot cone 32 at an outer circumferential periphery of the fins 17.

According to the cooling structure of the eleventh embodiment constructed as above, cooling air 300 flows on the outer wall side of the pilot cone 32 through spaces formed by the guide ring 131 and the plural fins 17 to flow out of an end portion of the pilot cone 32. As the heat dissipation area of the outer wall surface of the pilot cone 32 is increased by the fins 17, or the heat radiation area to the cooling air is increased by the fins 17, cooling of the wall is done more positively than in the prior art and the air after having cooled the wall can be used for dissolving flames staying at the end portion of the pilot cone 32.

It is understood that the invention is not limited to the particular construction and arrangement herein illustrated and described but embraces such modified forms thereof as come within the scope of the appended claims.

What is claimed is:

1. A gas turbine combustor cooling structure comprising a combustor pilot cone which is constructed such that said combustor pilot cone at its circumferential periphery is supported by a guide ring and a plurality of projecting fins are provided along a front and rear direction of said combustor pilot cone on an outer wall surface of said combustor pilot cone between said guide ring and said combustor pilot cone.

2. A gas turbine combustor cooling structure comprising:

an inner plate of one of a combustor wall and a pilot cone wall; and an outer plate of the one of the combustor wall and the pilot cone wall, said outer plate having an inner surface and a plurality of grooves along said inner surface, said inner plate being joined to said outer plate such that an outer surface of said inner plate is arranged against said inner surface of said outer plate and covers said grooves in said inner surface of said outer plate, whereby said grooves form a plurality of rows of cooling medium passages arranged along a combustion gas flow direction;

wherein each of said cooling medium passages has a cooling medium supply port and a cooling medium recovery port spaced apart so as to form a connection section therebetween, wherein said cooling medium supply port communicates with said cooling medium recovery port such that a cooling medium can flow into said cooling medium passage through said cooling medium supply port and can flow out of said cooling medium passage through said cooling medium recovery port; and wherein said connection section of each of said cooling medium passages has a passage cross-sectional area gradually changing along an entire length of said connection section between said cooling medium supply port and said cooling medium recovery port so that a flow velocity of the cooling medium may be gradually changed.

3. The gas turbine combustor cooling structure of claim 1, wherein each of said cooling medium passages has a passage cross-sectional width and a passage cross-sectional depth, at least one of said passage cross-sectional width and said passage cross-sectional depth gradually changing along an entire length of said connection section.

4. The gas turbine combustor cooling structure of claim 1, wherein said cooling medium passages are adapted to receive air as the cooling medium whereby said cooling medium supply port comprises an air supply port and said cooling medium recovery port comprises an air recovery port, each of said cooling medium passages having a passage cross-sectional width and a passage cross-sectional depth, at least one of said passage cross-sectional width and said passage cross-sectional depth gradually changing along an entire length of said connection section.

5. The gas turbine combustor cooling structure of claim 3, wherein each of said cooling medium passages has a plurality of turbulators in said connection section, said turbulators projecting inwardly toward a central axis of each of said cooling medium passages from an inner wall surface of each of said cooling medium passages.

6. The gas turbine combustor cooling structure of claim 3, wherein each of said cooling medium passages has a plurality of recess portions in an inner wall of said connection section, said recess portions being arranged orthogonally with respect to a cooling medium flow direction.

7. The gas turbine combustor cooling structure of claim 3, wherein each of said cooling medium passages has a passage cross-sectional area gradually increasing along an entire length of said connection section from said air supply port toward said air recovery port.

8. The gas turbine combustor cooling structure of claim 3, wherein said air recovery port of each of said cooling medium passages is formed at an oblique angle with respect to the combustion gas flow direction.

9. The gas turbine combustor cooling structure of claim 3, further comprising a cover at an outlet end of said air recovery port of each of said cooling medium passages, said cover being arranged so as to direct air exiting said air recovery port in the combustion gas flow direction.

10. The gas turbine combustor cooling structure of claim 3, wherein adjacent cooling medium passages are arranged such that air flowing through said connection section of each of said cooling medium passages from said air supply port to said air recovery port flows in opposite directions in said adjacent cooling medium passages.

11. The gas turbine combustor cooling structure of claim 3, further comprising a plurality of through-holes extending through said inner plate and said outer plate so as to connect an inner surface and an outer surface of one of the combustor wall and the pilot cone wall, wherein each of said cooling medium passages has an end portion communicating with one of said through-holes, each of said through-holes having a cover inserted into one end of each of said through-holes so as to close said one end of each of said through-holes.

12. The gas turbine combustor cooling structure of claim 3, wherein a diameter of said air recovery port of each of said cooling medium passages is larger than a diameter of said air supply port of each of said cooling medium passages.

13. The gas turbine combustor cooling structure of claim 1, wherein said cooling medium passages are adapted to receive steam as the cooling medium whereby said cooling medium supply port comprises a steam supply port and said cooling medium recovery port comprises a steam recovery port, each of said cooling medium passages having a passage cross-sectional width and a passage cross-sectional depth, at least one of said passage cross-sectional width and said passage cross-sectional depth gradually changing along an entire length of said connection section.

14. The gas turbine combustor cooling structure of claim 12, wherein each of said cooling medium passages has a plurality of turbulators in said connection section, said turbulators projecting inwardly toward a central axis of each of said cooling medium passages from an inner wall surface of each of said cooling medium passages.

15. The gas turbine combustor cooling structure of claim 12, wherein each of said cooling medium passages has a plurality of recess portions in an inner wall of said connection section, said recess portions being arranged orthogonally with respect to a cooling medium flow direction.

16. The gas turbine combustor cooling structure of claim 12, wherein adjacent cooling medium passages are arranged such that steam flowing through said connection section of each of said cooling medium passages from said steam supply port to said steam recovery port flows in opposite directions in said adjacent cooling medium passages.

17. The gas turbine combustor cooling structure of claim 12, further comprising a connecting portion groove at a wall connecting portion, each of said cooling medium passages communicating with said connecting portion groove.

18. A gas turbine combustor cooling structure comprising:

a combustor pilot cone including a wall having dimples, each of said dimples having a conical shape and projecting toward an inner side of said wall and into a combustion gas flow, each of said dimples having a hole in a conical sidewall thereof so that cooling air can be injected from an outer side of said wall to the inner side of said wall through said hole.

19. A gas turbine combustor cooling structure comprising:

an inner plate of one of a combustor wall and a pilot cone wall; and an outer plate of the one of the combustor wall and the pilot cone wall, said outer plate having an inner surface and a plurality of grooves along said inner surface, said inner plate being joined to said outer plate such that an outer surface of said inner plate is arranged against said inner surface of said outer plate and covers said grooves in said inner surface of said outer plate, whereby said grooves form a plurality of rows of cooling medium passages arranged along a combustion gas flow direction;

wherein each of said cooling medium passages has a cooling medium supply port and a cooling medium recovery port spaced apart so as to form a connection section therebetween, wherein said cooling medium supply port communicates with said cooling medium recovery port such that a cooling medium can flow into said cooling medium passage through said cooling medium supply port and can flow out of said cooling medium passage through said cooling medium recovery port; and wherein each of said cooling medium passages has a first portion having a constant cross-sectional area, and has a second portion, said first portion having a larger cross-sectional area than said second portion, and said first portion and said second portion being arranged alternately along said connection section so as to communicate with each other.

20. The gas turbine combustor cooling structure of claim 18, wherein said cooling medium recovery port of each of said cooling medium passages is formed at an oblique angle with respect to the combustion gas flow direction.

21. The gas turbine combustor cooling structure of claim 18, further comprising a cover at an outlet end of said cooling medium recovery port of each of said cooling medium passages, said cover being arranged so as to direct cooling medium exiting said cooling medium recovery port in the combustion gas flow direction.

22. The gas turbine combustor cooling structure of claim 18, wherein adjacent cooling medium passages are arranged such that cooling medium flowing through said connection section of each of said cooling medium passages from said cooling medium supply port to said cooling medium recovery port flows in opposite directions in said adjacent cooling medium passages.

23. The gas turbine combustor cooling structure of claim 18, further comprising a plurality of through-holes extending through said inner plate and said outer plate so as to connect an inner surface and an outer surface of one of the combustor wall and the pilot cone wall, wherein each of said cooling medium passages has an end portion communicating with one of said through-holes, each of said through-holes having a cover inserted into one end of each of said through-holes so as to close said one end of each of said through-holes.

24. A gas turbine combustor cooling structure comprising:

an inner plate of one of a combustor wall and a pilot cone wall; and an outer plate of the one of the combustor wall and the pilot cone wall, said outer plate having an inner surface and a plurality of grooves along said inner surface, said inner plate being joined to said outer plate such that an outer surface of said inner plate is arranged against said inner surface of said outer plate and covers said grooves in said inner surface of said outer plate, whereby said grooves form a plurality of rows of cooling medium passages arranged along a combustion gas flow direction;

wherein each of said cooling medium passages has a cooling medium supply port and a cooling medium recovery port spaced apart so as to form a connection section therebetween, wherein said cooling medium supply port communicates with said cooling medium recovery port such that a cooling medium can flow into said cooling medium passage through said cooling medium supply port and can flow out of said cooling medium passage through said cooling medium recovery port; and wherein each of said cooling medium passages has a wave shape.

25. The gas turbine combustor cooling structure of claim 23, wherein said cooling medium recovery port of each of said cooling medium passages is formed at an oblique angle with respect to the combustion gas flow direction.

26. The gas turbine combustor cooling structure of claim 23, further comprising a cover at an outlet end of said cooling medium recovery port of each of said cooling medium passages, said cover being arranged so as to direct cooling medium exiting said cooling medium recovery port in the combustion gas flow direction.

27. The gas turbine combustor cooling structure of claim 23, wherein adjacent cooling medium passages are arranged such that cooling medium flowing through said connection section of each of said cooling medium passages from said cooling medium supply port to said cooling medium recovery port flows in opposite directions in said adjacent cooling medium passages.

28. The gas turbine combustor cooling structure of claim 23, further comprising a plurality of through-holes extending through said inner plate and said outer plate so as to connect an inner surface and an outer surface of one of the combustor wall and the pilot cone wall, wherein each of said cooling medium passages has an end portion communicating with one of said through-holes, each of said through-holes having a cover inserted into one end of each of said through-holes so as to close said one end of each of said through-holes.

* * * * *